US012604180B2

(12) United States Patent
Yu et al.

(10) Patent No.: US 12,604,180 B2
(45) Date of Patent: Apr. 14, 2026

(54) NETWORK CAPABILITY EXPOSURE METHOD, APPARATUS, AND SYSTEM

(71) Applicant: Huawei Technologies Co., Ltd., Shenzhen (CN)

(72) Inventors: Fang Yu, Shenzhen (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 495 days.

(21) Appl. No.: 18/167,429

(22) Filed: Feb. 10, 2023

(65) Prior Publication Data

US 2023/0188974 A1 Jun. 15, 2023

Related U.S. Application Data

(63) Continuation of application No. PCT/CN2020/109021, filed on Aug. 13, 2020.

(51) Int. Cl.
*H04W 8/24* (2009.01)
*H04W 4/20* (2018.01)
*H04W 8/18* (2009.01)

(52) U.S. Cl.
CPC .............. *H04W 8/24* (2013.01); *H04W 4/20* (2013.01); *H04W 8/18* (2013.01)

(58) Field of Classification Search
CPC . H04L 41/12; H04L 61/4541; H04L 61/4588; H04W 24/02; H04W 4/20; H04W 8/18; H04W 8/24
USPC ........................................................ 455/419
See application file for complete search history.

(56) References Cited

U.S. PATENT DOCUMENTS

| | | | |
|---|---|---|---|
| 2019/0261260 A1* | 8/2019 | Dao ........................ | H04W 8/20 |
| 2020/0053638 A1 | 2/2020 | Edge et al. | |
| 2020/0252837 A1 | 8/2020 | Kim et al. | |
| 2020/0304986 A1* | 9/2020 | Li ......................... | H04W 48/06 |
| 2022/0408303 A1* | 12/2022 | Zhou ..................... | H04W 12/72 |
| 2023/0080830 A1* | 3/2023 | Fernandez Alonso ...................... | |
| | | | H04L 12/1407 |
| | | | 455/422.1 |

(Continued)

FOREIGN PATENT DOCUMENTS

| | | |
|---|---|---|
| CN | 109842895 A | 6/2019 |
| CN | 110366145 A | 10/2019 |

(Continued)

OTHER PUBLICATIONS

Convida Wireless LLC, Introduction of the MSISDN-less MO SMS Service. 3GPP TSG-SA WG2 Meeting #130, Kechi, India, Jan. 21-25, 2019, S2-1901063, 8 pages.

(Continued)

*Primary Examiner* — Hirdepal Singh
(74) *Attorney, Agent, or Firm* — Slater Matsil, LLP

(57) ABSTRACT

This application discloses a network capability exposure method, apparatus, and system. The method includes: An NEF receives a first request sent by an AF, where the first request includes an address of a target terminal device, and is used to request first information of the target terminal device; sends, to a first network element, a second request including the address, to request a first identifier of the target terminal device; receives the first identifier from the first network element; and sends, to a second network element, a third request including the first identifier, to request the first information.

20 Claims, 10 Drawing Sheets

(56) References Cited

U.S. PATENT DOCUMENTS

2023/0143200 A1* 5/2023 Kweon ................... H04L 67/55
709/223

FOREIGN PATENT DOCUMENTS

| CN | 110650034 A | 1/2020 |
|---|---|---|
| EP | 3761711 A1 | 1/2021 |
| WO | 2019206322 A1 | 10/2019 |

OTHER PUBLICATIONS

3GPP TS 23.558 V0.4.0 (Aug. 2020), 3rd Generation Partnership Project; Technical Specification Group Services and System Aspects; Architecture for enabling Edge Applications;(Release 17), 89 pages.

Nokia et al., "Correcting AMF behaviour for Service Request that is not integrity protected", SA WG2 Meeting #132, S2-1903668, Xi'an, PR China, Apr. 8-12, 2019, 376 pages.

3GPP TS 23.682 V16.7.0 (Jul. 2020), "3rd Generation Partnership Project, Technical Specification Group Services and System Aspects, Architecture enhancements to facilitate communications with packet data networks and applications (Release 16)", Sophia Antipolis, Valbonne—France, 134 pages.

3GPP TS 23.003 V16.3.0 (Jun. 2020), "3rd Generation Partnership Project, Technical Specification Group Core Network and Terminals, Numbering, addressing and identification, (Release 16)", Sophia Antipolis, Valbonne—France, 141 pages.

3GPP TS 23.501 V16.5.1 (Aug. 2020), "3rd Generation Partnership Project, Technical Specification Group Services and System Aspects, System architecture for the 5G System (5GS), Stage 2 (Release 16)", Sophia Antipolis, Valbonne—France, 440 pages.

3GPP TS 23.502 V16.5.1 (Aug. 2020), 3rd Generation Partnership Project, Technical Specification Group Services and System Aspects, Procedures for the 5G System (5GS), Stage 2 (Release 16), Sophia Antipolis, Valbonne—France, 594 pages.

3GPP TR 23.758 V17.0.0 (Dec. 2019), "3rd Generation Partnership Project, Technical Specification Group Services and System Aspects, Study on application architecture for enabling Edge Applications, (Release 17)", , Sophia Antipolis, Valbonne—France, 113 pages.

3GPP TS 33.501 V16.3.0 (Jul. 2020), "3rd Generation Partnership Project, Technical Specification Group Services and System Aspects, Security architecture and procedures for 5G system (Release 16)", Sophia Antipolis, Valbonne—France, 248 pages.

3GPP TSG SA WG6, "LS on IP address to GPSI translation", SA WG2 Meeting #S2-139E, S2-2004338, Electronic, Elbonia, Jun. 1-12, 2020, 2 pages.

Huawei, Hisilicon, Samsung, "Procedure of NEF based Non-IP Data Delivery," 3GPP TSG-SA WG2 Meeting #131, Feb. 25-Mar. 1, 2019, Santa Cruz-Tenerife, S2-1901648, 7 pages.

Vivo, "Clarification on location authorization and location privacy check," 3GPP TSG-SA WG2 Meeting #136, Reno (US), Nov. 18-22, 2019, S2-1911425, 12 pages.

Nokia, Nokia Shanghai Bell, "KI#3, new solution: Providing selected radio information to an App requiring it," SA WG2 Meeting #139e, Jun. 1-12, 2020, Elbonia, S2-2003660, 5 pages.

Huawei, HiSilicon, "Update and clarification of AF influence on traffic routing," 3GPP TSG SA WG2 Meeting #124, Nov. 27-Dec. 1, 2017, Reno, US, S2-179557, 8 pages.

* cited by examiner

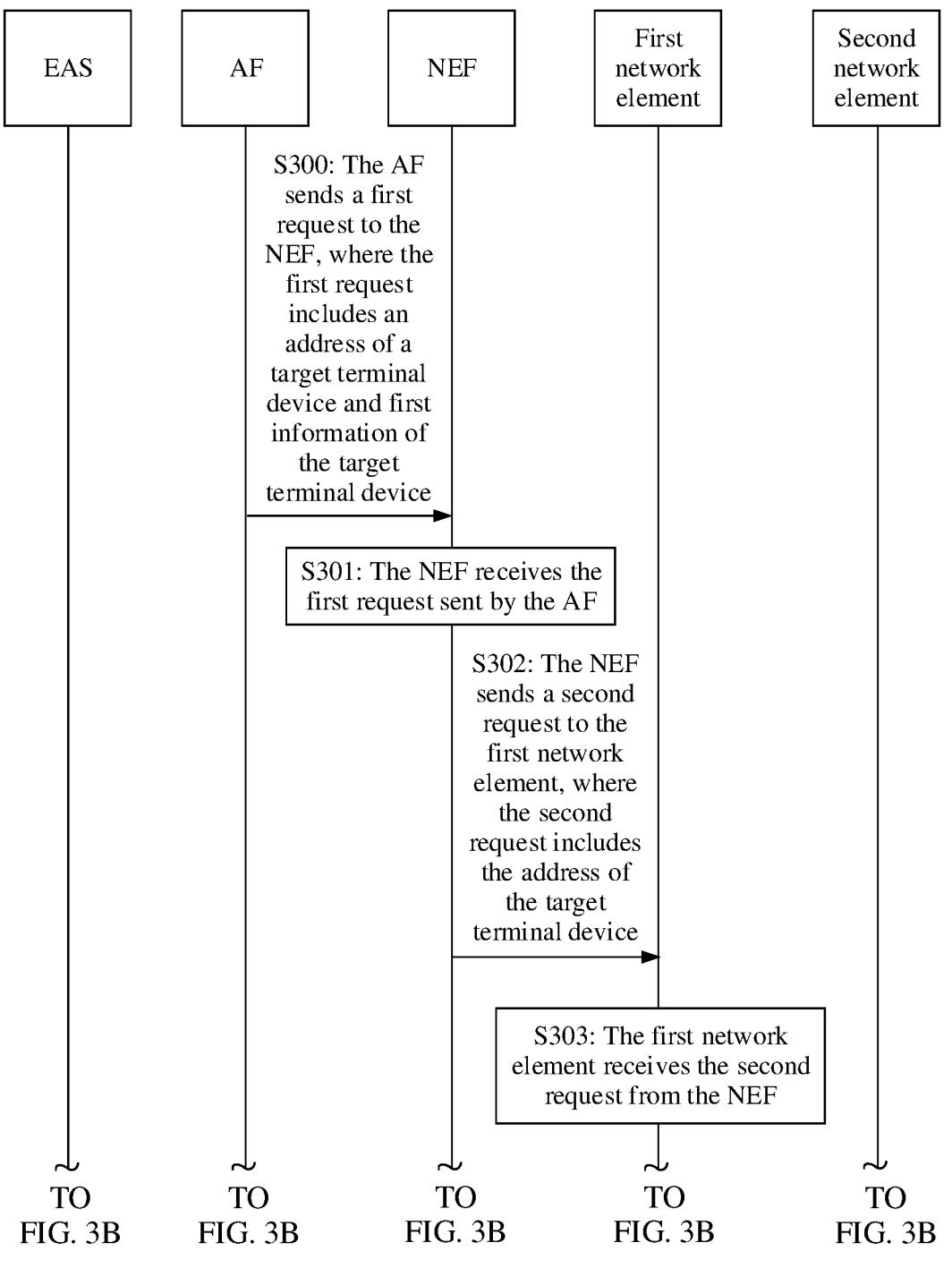

| EAS | AF | NEF | First network element | Second network element |

S300: The AF sends a first request to the NEF, where the first request includes an address of a target terminal device and first information of the target terminal device S301: The NEF receives the first request sent by the AF S302: The NEF sends a second request to the first network element, where the second request includes the address of the target terminal device S303: The first network element receives the second request from the NEF

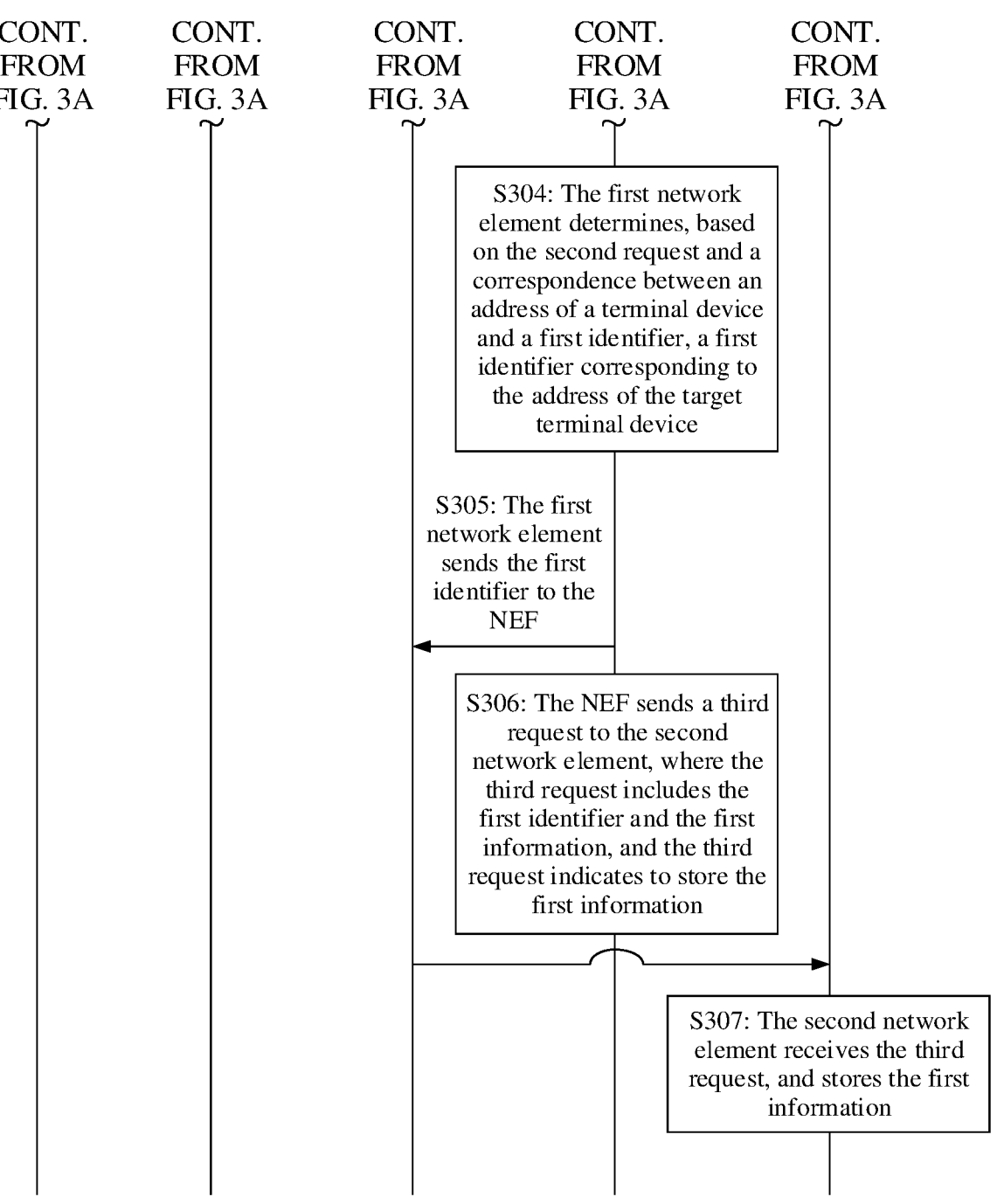

CONT. FROM FIG. 3A          CONT. FROM FIG. 3A          CONT. FROM FIG. 3A          CONT. FROM FIG. 3A          CONT. FROM FIG. 3A

S304: The first network element determines, based on the second request and a correspondence between an address of a terminal device and a first identifier, a first identifier corresponding to the address of the target terminal device S305: The first network element sends the first identifier to the NEF S306: The NEF sends a third request to the second network element, where the third request includes the first identifier and the first information, and the third request indicates to store the first information S307: The second network element receives the third request, and stores the first information

FIG. 3B

NETWORK CAPABILITY EXPOSURE METHOD, APPARATUS, AND SYSTEM

CROSS-REFERENCE TO RELATED APPLICATIONS

This application is a continuation of International Application No. PCT/CN2020/109021, filed on Aug. 13, 2020, the disclosure of which is hereby incorporated by reference in its entirety.

TECHNICAL FIELD

This application relates to the field of communication technologies, and in particular, to a network capability exposure method, apparatus, and system.

BACKGROUND

In a network communication process, an edge application server (EAS) usually obtains information about a target terminal device from an application function (AF) network element based on a generic public subscription identifier (GPSI) of the target terminal device, to provide service support. The AF usually calls, based on the GPSI, an application programming interface (API) provided by another network element in a 3rd Generation Partnership Project (3GPP) network, to obtain or provide network capability exposure information related to the target terminal device.

In a current communication process, for security purposes, an API for network capability exposure provides, based on a GPSI of a terminal device, a channel for exchanging network capability exposure information. However, an EAS or an AF in a current communication system cannot actively obtain a GPSI of a target terminal device, affecting calling of an API for network capability exposure by the EAS or the AF. Consequently, exchange of network information related to the target terminal device is affected, and service experience of the target terminal device is affected.

SUMMARY

This application provides a network capability exposure method, apparatus, and system, to provide a more flexible and efficient network capability exposure method.

According to a first aspect, this application provides a network capability exposure method. The method includes:

An NEF receives a first request from an AF, where the first request includes an address of a target terminal device; the NEF sends a second request to a first network element, where the second request includes the address of the target terminal device, and the second request is used to request a first identifier for identifying the target terminal device in a 3GPP system; the NEF receives the first identifier from the first network element; the NEF determines, based on the first identifier, a second identifier for identifying the target terminal device outside the 3GPP system; and the NEF sends the second identifier to the AF, where the second identifier is used to expose an API interface corresponding to the second identifier.

Based on the foregoing solution, in this embodiment of this application, the NEF can actively obtain the second identifier of the target terminal device, to provide the second identifier of the target terminal device to an EAS, so that the EAS can call the corresponding API by using the second identifier, to effectively expose and share network capability information with high flexibility.

In a possible implementation method, the NEF sends, to a UDM, a third request including the first identifier, where the third request is used to obtain the second identifier; and the NEF receives the second identifier from the UDM, where the second identifier is obtained by the UDM based on the third request and a correspondence between a first identifier and a second identifier.

In a possible implementation method, the first network element is a UPF network element, or the first network element is a PCF network element.

In a possible implementation method, when the first network element is a UPF network element, both the NEF and the UPF are locally deployed network elements. In a possible implementation method, before that the NEF sends a second request to a first network element, the method further includes: When the first network element is the PCF network element, the NEF sends a fourth request to a BSF, where the fourth request is used to obtain an address of the PCF serving the target terminal device; and the NEF receives the address of the PCF from the BSF.

In a possible implementation method, the first identifier is a subscription permanent identifier SUPI of the target terminal device, and the second identifier is a generic public subscription identifier GPSI of the target terminal device.

According to a second aspect, this application provides a network capability exposure method. The method includes:

An NEF receives a first request sent by an AF, where the first request includes an address of a target terminal device and first information of the target terminal device; the NEF sends a second request to a first network element, where the second request includes the address of the target terminal device, and the second request is used to request a first identifier for identifying the target terminal device in a 3GPP system; the NEF receives the first identifier from the first network element; and the NEF sends a third request to a second network element, where the third request includes the first identifier and the first information, and the third request indicates to store the first information.

Based on the foregoing solution, in this embodiment of this application, the NEF can obtain the second identifier of the target terminal device, to expose the first information of the target terminal device to another network element by using the second identifier of the target terminal device, and further provide an API based on the address of the terminal device to the AF. This is conducive to exposure of the first information based on the address of the terminal device by the AF and obtaining of the first information of the target terminal device by another network element, to effectively expose and share network capability information.

In a possible implementation method, the first network element is a UPF network element, or the first network element is a PCF network element.

In a possible implementation method, before that the NEF sends a second request to a first network element, the method further includes: When the first network element is the PCF network element, the NEF sends a fourth request to a BSF, where the fourth request is used to obtain an address of the PCF serving the target terminal device; and the NEF receives the address of the PCF from the BSF.

In a possible implementation method, the second network element is a UDM, or the second network element is an NWDAF.

In a possible implementation method, when the second network element is the UDM, the third request is used by the NEF to indicate, via the UDM, a third network element to store the first information; and the third network element is one of an AMF network element, an SMF network element, or a UDR.

In a possible implementation method, the first information includes a part or all of the following: 5G LAN group information, predicted behavior information of the target terminal device, a network configuration parameter of the target terminal device, and a location of the target terminal device.

According to a third aspect, this application provides a network capability exposure method. The method includes:

An NEF receives a first request sent by an AF, where the first request includes an address of a target terminal device, and the first request is used to request first information of the target terminal device from a 3GPP system; the NEF sends a second request to a first network element, where the second request includes the address of the target terminal device, and the second request is used to request a first identifier for identifying the target terminal device in the 3GPP system; the NEF receives the first identifier from the first network element; and the NEF sends a third request to a second network element, where the third request includes the first identifier, and the third request is used to request the first information.

Based on the foregoing solution, this embodiment of this application provides a method for actively obtaining, by the NEF, the first identifier of the target terminal device, and the NEF can request the first information from another network element based on the first identifier.

In a possible implementation, requesting the first information may be requesting to subscribe to the first information or requesting to unsubscribe from the first information.

In a possible implementation method, when the third request is used to request to subscribe to the first information, the method further includes: The NEF receives the first information from the second network element, and sends the first information to the AF.

In a possible implementation method, the first network element is a UPF network element, or the first network element is a PCF network element.

In a possible implementation method, before that the NEF sends a second request to a first network element, the method further includes: When the first network element is the PCF network element, the NEF sends a fourth request to a BSF, where the fourth request is used to obtain an address of the PCF serving the target terminal device; and the NEF receives the address of the PCF from the BSF.

In a possible implementation method, the second network element is a UDM or a network data analytics function network element (Network Data Analytics Function, NWDAF). When the second network element is the UDM, the third request is used by the NEF to request, via the UDM, the first information from a third network element. When the second network element is the NWDAF, the third request is used by the NEF to request the first information from the NWDAF.

In a possible implementation method, the third network element is one of an AMF network element, an SMF network element, or a UDR.

In a possible implementation method, the first information includes a part or all of the following: a location of the target terminal device, a congestion status of a cell in which the target terminal device is located, and a quality of service QoS monitoring result of the target terminal device.

According to a fourth aspect, this application provides a network capability exposure method. The method includes:

An AF sends a first request to a first network element, where the first request includes an address of the target terminal device, and the first request is used to request a first identifier for identifying the target terminal device in a 3GPP system; the AF receives the first identifier from the first network element; and the AF sends a second request to a second network element, where the second request includes the first identifier and first information, and the second request indicates to store the first information of the target terminal device.

Based on the foregoing solution, this embodiment of this application provides a method for actively obtaining, by the AF, the first identifier of the target terminal device, to expose the first information of the target terminal device to another network element by using the first identifier of the target terminal device. This is conducive to exposure of the first information based on the address of the terminal device by the AF and obtaining of the first information of the target terminal device by another network element, to effectively expose and share network capability information, ensure exchange of network information related to the terminal device, and ensure service experience of the terminal device.

In a possible implementation method, before the AF sends the first request, the AF determines the address of the target terminal device and the first information of the target terminal device.

In a possible implementation method, the AF determines the address of the target terminal device and the first information based on a received third request sent by an EAS, where the third request includes the address of the target terminal device and the first information.

In a possible implementation method, the first network element is a PCF network element, and before that an AF sends a first request to a first network element, the method further includes: The AF sends a fourth request to a BSF, where the fourth request is used to obtain the PCF serving the target terminal device; and the AF receives an address of the PCF from the BSF.

In a possible implementation method, the second network element is a UDM, or the second network element is an NWDAF.

In a possible implementation method, when the second network element is the UDM, the second request is used by the AF to indicate, via the UDM, a third network element to store the first information; and the third network element is one of an AMF network element, an SMF network element, or a UDR.

In a possible implementation method, the first information includes a part or all of the following: 5G LAN group information, predicted behavior information of the target terminal device, and a network configuration parameter of the target terminal device.

According to a fifth aspect, this application provides a network capability exposure method. The method includes:

An AF sends a first request to a first network element, where the first request includes an address of the target terminal device, and the first request is used to request a first identifier for identifying the target terminal device in a 3GPP system; the AF receives the first identifier from the first network element; and the AF sends a second request to a second network element, where the second request includes the first identifier, and the second request indicates to request the first information.

Based on the foregoing solution, this embodiment of this application provides a method for actively obtaining, by the AF, the first identifier of the target terminal device, and the AF can request the first information from another network element based on the first identifier, to ensure exchange of network information related to the terminal device, and ensure service experience of the terminal device.

In a possible implementation, requesting the first information may be requesting to subscribe to the first information or requesting to unsubscribe from the first information.

In a possible implementation method, when the second request is used to request to subscribe to the first information, the method further includes: The AF receives the first information from the second network element.

In a possible implementation method, the first network element is a PCF network element.

In a possible implementation method, before that the AF sends a first request to a first network element, the method further includes: When the first network element is the PCF network element, the AF sends a third request to a BSF, where the third request is used to obtain an address of the PCF serving the target terminal device; and the AF receives the address of the PCF from the BSF.

In a possible implementation method, the second network element is a UDM or an NWDAF. When the second network element is the UDM, the second request is used by the AF to request, via the UDM, the first information from a third network element. When the second network element is the NWDAF, the second request is used by the AF to request the first information from the NWDAF.

In a possible implementation method, the third network element is one of an AMF network element, an SMF network element, or a UDR.

In a possible implementation method, the first information includes a part or all of the following: a location of the target terminal device, a congestion status of a cell in which the target terminal device is located, and a QoS monitoring result of the target terminal device.

According to a sixth aspect, this application provides a network capability exposure method. The method includes:

An AF sends a first request to an NEF, where the first request includes an address of a target terminal device, and the first request is used to request a second identifier for identifying the target terminal device outside a 3GPP system; the AF receives the second identifier from the NEF; and the AF sends the second identifier to an EAS, where the second identifier is used to expose an API interface corresponding to the second identifier.

Based on the foregoing solution, in this embodiment of this application, the NEF can actively obtain the second identifier of the target terminal device, to provide the second identifier of the target terminal device to the EAS via the AF, so that the EAS can call the corresponding API by using the second identifier, to effectively expose and share network capability information with high flexibility.

In a possible implementation method, before that an AF sends a first request to an NEF, the method further includes: The AF receives a second request sent by the EAS, where the second request is used to request the second identifier, and the second request includes the address of the target terminal device.

In a possible implementation method, the second identifier is obtained by the NEF by converting, via a UDM, a first identifier obtained from a first network element, and the first identifier is used to identify the target terminal device in the 3GPP system.

In a possible implementation method, the first network element is a UPF network element, or the first network element is a PCF network element.

According to a seventh aspect, this application provides a network capability exposure method. The method includes:

A UDM receives a request that is sent by an AF or an NEF and that is used to obtain a second identifier, where the request includes a first identifier used to identify the target terminal device in a 3GPP system, and the second identifier is used to identify the target terminal device outside the 3GPP system; the UDM determines the second identifier based on the first identifier and a correspondence between a first identifier and a second identifier; and the UDM feeds back the second identifier to the AF or the NEF.

According to an eighth aspect, this application provides a network capability exposure method. The method includes:

A UDM receives a request that is sent by an AF or an NEF and that indicates to store first information of a target terminal device, where the request includes the first information and a first identifier used to identify the target terminal device in a 3GPP system, and the first information is network capability exposure information provided by the AF to the 3GPP system; and the UDM indicates, based on the request, a third network element to store the first information.

In a possible implementation method, the third network element is one of an AMF network element, an SMF network element, or a UDR.

According to a ninth aspect, this application provides a network capability exposure method. The method includes:

A UDM receives a request that is sent by an AF or an NEF and that indicates the AF to request first information from a 3GPP system, where the request includes a first identifier used to identify a target terminal device in the 3GPP system; and the UDM requests the first information from a third network element based on the request.

In a possible implementation, requesting the first information may be requesting to subscribe to the first information or requesting to unsubscribe from the first information.

In a possible implementation method, the third network element is one of an AMF network element, an SMF network element, or a UDR.

According to a tenth aspect, this application provides a network capability exposure method. The method includes:

An NWDAF receives a request that is sent by an AF or an NEF and that indicates to store first information of a target terminal device, where the request includes the first information and a first identifier used to identify the target terminal device in a 3GPP system, and the first information is network capability exposure information provided by the AF to the 3GPP system; and the NWDAF stores the first information based on the request.

According to an eleventh aspect, this application provides a network capability exposure method. The method includes:

An NWDAF receives a request that is sent by an AF or an NEF and that indicates the AF to request first information from a 3GPP system, where the request includes a first identifier used to identify a target terminal device in the 3GPP system; and the NWDAF provides the first information based on the request.

In a possible implementation, requesting the first information may be requesting to subscribe to the first information or requesting to unsubscribe from the first information.

According to a twelfth aspect, an embodiment of this application provides a network capability exposure apparatus. The apparatus may be an NEF, or may be a chip used for the NEF. The apparatus can implement any one of the first aspect to the third aspect, or perform any method in any one of the possible implementations of the first aspect to the third aspect. The function may be implemented by hardware, or may be implemented by hardware executing corresponding software. The hardware or the software includes one or more modules corresponding to the function.

According to a thirteenth aspect, an embodiment of this application provides a network capability exposure apparatus. The apparatus may be an AF, or may be a chip used for the AF. The apparatus can implement any one of the fourth aspect to the sixth aspect, or perform any method in any one of the possible implementations of the fourth aspect to the sixth aspect. The function may be implemented by hardware, or may be implemented by hardware executing corresponding software. The hardware or the software includes one or more modules corresponding to the function.

According to a fourteenth aspect, an embodiment of this application provides a network capability exposure apparatus. The apparatus may be a UDM, or may be a chip used for the UDM. The apparatus can implement any one of the seventh aspect to the ninth aspect, or perform any method in any one of the possible implementations of the seventh aspect to the ninth aspect. The function may be implemented by hardware, or may be implemented by hardware executing corresponding software. The hardware or the software includes one or more modules corresponding to the function.

According to a fifteenth aspect, an embodiment of this application provides a network capability exposure apparatus. The apparatus may be an NWDAF, or may be a chip used for the NWDAF. The apparatus can implement either of the tenth aspect and the eleventh aspect, or perform any method in any one of the possible implementations of the tenth aspect and the eleventh aspect. The function may be implemented by hardware, or may be implemented by hardware executing corresponding software. The hardware or the software includes one or more modules corresponding to the function.

According to a sixteenth aspect, an embodiment of this application provides a network capability exposure apparatus, including a processor and a memory. The memory is configured to store computer executable instructions. When the apparatus runs, the processor executes the computer executable instructions stored in the memory, to enable the apparatus to perform any one of the first aspect to the eleventh aspect, or perform any method in any one of the possible implementations of the first aspect to the eleventh aspect.

According to a seventeenth aspect, an embodiment of this application further provides a computer-readable storage medium. The computer-readable storage medium stores instructions, and when the instructions are run on a computer, the processor is enabled to perform any one of the first aspect to the eleventh aspect, or perform any method in any one of the possible implementations of the first aspect to the eleventh aspect.

According to an eighteenth aspect, an embodiment of this application further provides a computer program product. The computer product includes a computer program, and when the computer program is run, the processor is enabled to perform any one of the first aspect to the eleventh aspect, or perform any method in any one of the possible implementations of the first aspect to the eleventh aspect.

According to a nineteenth aspect, an embodiment of this application further provides a chip system, including a processor and a memory. The memory is configured to store a computer program; the processor is configured to invoke the computer program from the memory and run the computer program, to enable a device on which the chip system is installed to perform any one of the first aspect to the eleventh aspect, or perform any method in any one of the possible implementations of the first aspect to the eleventh aspect.

According to a twentieth aspect, an embodiment of this application further provides a network capability exposure system, including: an NEF, a PCF/UPF, a UDM network element/NWDAF, and the like.

In a possible implementation method, the network capability exposure system further includes an AF.

In a possible implementation method, the network capability exposure system further includes one of an AMF network element, an SMF network element, or a UDR.

BRIEF DESCRIPTION OF THE DRAWINGS

FIG. 3A and FIG. 3B are a schematic flowchart of a second network capability exposure method according to this application;

DETAILED DESCRIPTION OF ILLUSTRATIVE EMBODIMENTS

To describe the technical solutions in this application more clearly, the following describes embodiments of this application with reference to the accompanying drawings.

Communication devices in embodiments of this application mainly include a terminal device, an application function (AF) network element, a network exposure function (NEF) network element, a first network element, a unified data management (UDM) network element, and the like.

In an optional manner in embodiments of this application, the first network element is a policy control function (PCF) network element, or the first network element is a user plane function (UPF).

Preferably, when the first network element is the PCF network element, and there are at least two PCF network elements in a communication system, the communication system may further include a binding support function (BSF). The BSF is configured to help the NEF determine a PCF network element serving a target terminal device.

Further, the communication system in embodiments of this application may be used in a 5th generation (5G) network architecture, or certainly, may be used in a future network architecture, for example, a 6th generation (6G) network architecture. This is not limited in this application.

Figure 1:
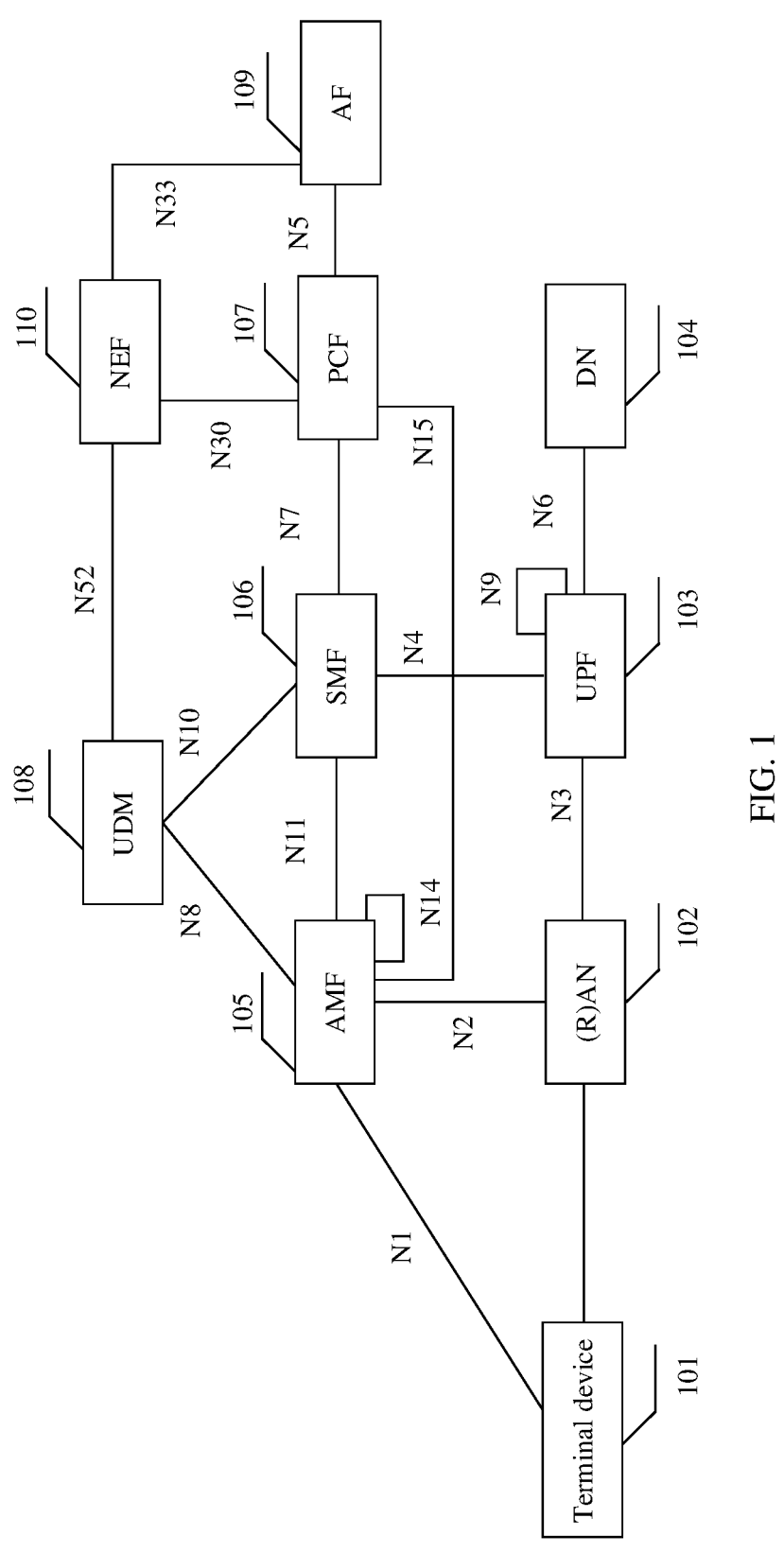
FIG. 1 is a schematic diagram of a scenario of network capability exposure according to this application.

The following uses the 5G network architecture as an example for brief description. As shown in FIG. 1, the 5G network architecture may include three parts: a terminal device part (namely, UE) 101, a data network (DN) 104, and a core network part. A core network includes a user plane network element 103, a mobility management network element 105, a session management network element 106, a policy control network element 107, a subscriber data management network element 108, and a network capability exposure network element 110.

For example, in the communication system, the terminal device accesses a core network via an access network (RAN) device. The terminal device may establish a connection to the data network (DN) via an access network and the core network. The data network may include, for example, an operator service, the Internet, or a third-party service, or serve as an access point of the foregoing service. In a 4G communication system, the connection may be a packet data network connection (PDN connection) or a bearer. In a 5G communication system, the connection may be a protocol data unit session (PDU Session). In a future communication system such as a 6th generation (6G) communication system, the connection may be a PDU session, a PDN connection, or another similar concept. This is not limited in embodiments of this application. In embodiments of this application, the connection established between the terminal device and the data network is also referred to as a session.

Further, in the 5G network architecture shown in FIG. 1, names and functions of devices (network elements) and interfaces between devices (network elements) are as follows:

(1) The terminal device 101 is a device configured to implement a wireless communication function, for example, a terminal or a chip that may be used in the terminal; and may be deployed on land, including an indoor or outdoor device, a handheld device, or a vehicle-mounted device; or may be deployed on the water (for example, on a ship); or may be deployed in the air (for example, on an airplane, a balloon, or a satellite). The terminal may be user equipment (UE), an access terminal, a terminal unit, a terminal station, a mobile station, a remote station, a remote terminal, a mobile device, a wireless communication device, a terminal agent, a terminal apparatus, or the like in a 4G network, a 5G network, or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self-driving, a wireless terminal in telemedicine which is also called remote medical, a wireless terminal in a smart grid, a wireless terminal in transportation safety, a wireless terminal in a smart city, a wireless terminal in a smart home, or the like. The terminal device may be mobile or fixed.

In embodiments of this application, the terminal device may be handed over from the 4G communication system to the 5G communication system, or may be handed over from the 5G communication system to the 4G communication system.

(2) The access network device 102 is a device that provides a wireless communication function for the terminal device 101. For example, the access network device includes but is not limited to a next-generation access network (NG-RAN), a next-generation base station (gNodeB, gNB), an evolved NodeB (eNB), a radio network controller (RNC), a NodeB (NodeB, NB), a base station controller (BSC), a base transceiver station (BTS), a home base station (for example, home evolved NodeB, or home NodeB, HNB), a baseband unit (BBU), a transmission reception point (TRP), a transmission point (TP), or a mobile switching center.

(3) The user plane network element 103 is mainly configured to forward user data packets according to a routing rule of the session management network element. In the 4G communication system, the user plane network element may be a serving gateway user plane (SGW-U), a packet data network gateway user plane (PGW-U), or a network element in which an SGW-U and a PGW-U are co-deployed. In the 5G communication system, the user plane network element may be a user plane function (UPF) network element.

(4) The mobility management network element 105 is mainly used for mobility management in a mobile network, for example, user location update, registration of a user with a network, and user handover. In the 4G communication system, the mobility management network element may be a mobility management entity (MME). In the 5G communication system, the mobility management network element may be an access and mobility management function (AMF).

(5) The session management network element 106 is mainly used for session management in the mobile network, such as session establishment, modification, and release. A specific function is, for example, allocating an Internet protocol (IP) address to a user, or selecting a user plane network element that provides a packet forwarding function. In the 4G communication system, the session management network element may be a serving gateway control plane (SGW-C), a packet data network gateway control plane (PGW-C), or a network element in which an SGW-C and a PGW-C are co-deployed. In the 5G system, the session management network element may be a session management function (SMF).

(6) The policy control network element 107 has a user subscription data management function, a policy control function, a charging policy control function, quality of service (QoS) control, and the like. In the 4G communication system, the policy control network element may be a policy control and charging function (PCRF). In the 5G communication system, the policy control network element may be a policy control function (PCF).

(7) The unified data management network element 108 is a network element responsible for managing subscription information of the terminal device. In the 4G communication system, the unified data management network element may be a home subscriber server (HSS). In the 5G communication system, the unified data management network element may be a unified data management (UDM).

(8) The application function network element 109 is mainly configured to provide a service to a 3GPP network, for example, affect service routing or interact with a PCF to perform policy control. In the 5G communication system, the application function network element may be an application function (AF) network element.

(9) The network capability exposure network element 110 is mainly configured to expose a capability of a communication system to a third party, an application service function, and the like, and transfer information between the third party, the application server, and the communication system. In the 4G communication system, the network capability exposure network element may be a service capability exposure function (SCEF). In the 5G communication system, the network capability exposure network element may be a network exposure function (NEF).

(10) N7 refers to an interface between the PCF and SMF, and is used to deliver PDU session and service data flow control policies.

(11) N15 refers to an interface between the PCF and AMF, and is used to deliver UE mobility and network selection control policies.

(12) N5 refers to an interface between the AF and PCF, and is used to deliver an application service request and report a network event.

(13) N4 refers to an interface between the SMF and the UPF, and is used to transfer information between a control plane and a user plane, including delivery of a forwarding rule, a QoS control rule, a traffic statistics rule, and the like from the control plane to the user plane, and reporting of user plane information.

(14) Nil refers to an interface between the SMF and the AMF, and is used to: transfer user plane tunnel information between the RAN and the UPF, transfer a control message to be sent to UE, transfer radio resource control information to be sent to the RAN, and so on.

(15) N2 refers to an interface between the AMF and the RAN, and is used to transfer radio bearer control information from a core network side to the RAN, and so on.

(16) N1 refers to an interface between the AMF and the UE, is access-irrelevant, and is used to transfer a QoS control rule to the UE, and so on.

In a future communication system such as a 6G communication system, the network element or the device may still use a name of the network element or the device in the 4G or 5G communication system, or have another name. A function of the network element or the device may be completed by one independent network element, or may be jointly completed by several network elements. This is not limited in embodiments of this application.

During actual deployment, network elements in the core network may be co-deployed. For example, the mobility management network element 105 may be co-deployed with the session management network element 106; the session management network element 106 may be co-deployed with the user plane network element 103; and the policy control network element 107 may be co-deployed with the unified data management network element 108. When two network elements are co-deployed, interaction between the two network elements provided in embodiments of this application becomes an internal operation of the co-deployed network elements or may be omitted.

It should be noted that the "network element" may also be referred to as an entity, a device, an apparatus, a module, or the like. This is not particularly limited in this application. In addition, in this application, for ease of understanding and description, the description of the "network element" is omitted in some descriptions. For example, an AF network element is referred to as an AF for short. In this case, the "AF network element" should be understood as an AF network element or an AF entity. Same or similar cases are not described below. It may be understood that the foregoing network elements or the functions may be network elements in a hardware device, software functions running on dedicated hardware, or virtualized functions instantiated on a platform (for example, a cloud platform). Optionally, the foregoing network elements or the functions may be implemented by one device, may be implemented by a plurality of devices, or may be one functional module in one device. This is not specifically limited in embodiments of this application. Network elements having a same function or similar functions may be jointly set.

It should be understood that the foregoing network architecture applied to this application is merely an example of a network architecture described from a perspective of a service-based architecture, and a network architecture applicable to embodiments of this application is not limited thereto. Any network architecture that can implement functions of the foregoing network elements is applicable to embodiments of this application.

The network architecture and the service scenario described in the embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems. It should be understood that FIG. 1 is merely a simplified schematic diagram of an example for ease of understanding. The network architecture may further include another device (network element), which is not shown in FIG. 1. For a problem that an EES or an AF in a current communication system cannot actively obtain a GPSI of a target terminal device, affecting exchange of network information related to the terminal and affecting service experience of the terminal, based on the foregoing network architecture or a variation of the foregoing network architecture, embodiments of this application provide a method in which an AF network element obtains an identifier of a target terminal device by interacting with a PCF or a UPF via an NEF, and implements network capability exposure based on the identifier of the target terminal device, and further provide a method in which an AF obtains an identifier of a target terminal device by directly interacting with a PCF, and implements network capability exposure based on the identifier of the target terminal device, so that network capability exposure can be implemented more efficiently and flexibly.

The network capability exposure method provided in this application may be applied to any communication transmission scenario, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WIMAX) communication system, and a fifth generation (5G) system or a new radio (NR) system, or is applied to a future communication system or another similar communication system.

In an optional manner in embodiments of this application, the AF is also referred to as an edge enabler server (EES) in a mobile edge computing (MEC) scenario. For specific and brief description, the following uses the AF as an example for specific description.

It should be noted that embodiments of this application are not limited to the MEC scenario. To be specific, an EAS may not be deployed at a network edge, but may be deployed at an application server (AS) at any location. Any network element having a function similar to that of the AF may be applied to embodiments of this application, and falls within the protection scope of embodiments of this application.

Some terms in embodiments of this application are explained and described below for ease of understanding.

(1) A subscription permanent identifier (SUPI) in embodiments of this application is an identifier used to identify a target terminal device in a 3GPP system. In embodiments of this application, a first identifier is used to represent the SUPI.

(2) A generic public subscription identifier (GPSI) in embodiments of this application is an identifier used to identify the target terminal device outside the 3GPP system. In embodiments of this application, a second identifier is used to represent the GPSI.

In the 3GPP system, an association relationship between the GPSI and the corresponding SUPI is stored in subscription data. The GPSI is a mobile station international subscriber directory number (MSISDN) or other external identifiers.

In this application, an address of the terminal device may be an IP address of the terminal device, for example, an IPv4 address or an IPv6 address prefix, or may be a MAC address of the terminal device. This is not limited. An address of a PCF may be an IP address of the PCF, for example, an IPv4 address or an IPv6 address prefix, or may be a MAC address of the PCF.

In addition, the terms "system" and "network" in embodiments of this application may be used interchangeably. "At least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

Unless otherwise stated, ordinal numbers such as "first" and "second" mentioned in embodiments of this application are used to distinguish between a plurality of objects, and are not intended to limit a sequence, a time sequence, priorities, or importance of the plurality of objects. In addition, the terms "include" and "have" in embodiments, the claims, and the accompanying drawings of this application are not exclusive. For example, a process, a method, a system, a product, or a device including a series of steps or modules is not limited to the listed steps or modules, and may further include steps or modules that are not listed.

For ease of understanding of embodiments of this application, the following separately describes in detail, based on different application scenarios, the network capability exposure method provided in embodiments of this application.

Scenario 1: An AF and a first network element need to interact with each other via an NEF, that is, the AF may be a network element provided by a third party.

Figure 2A:
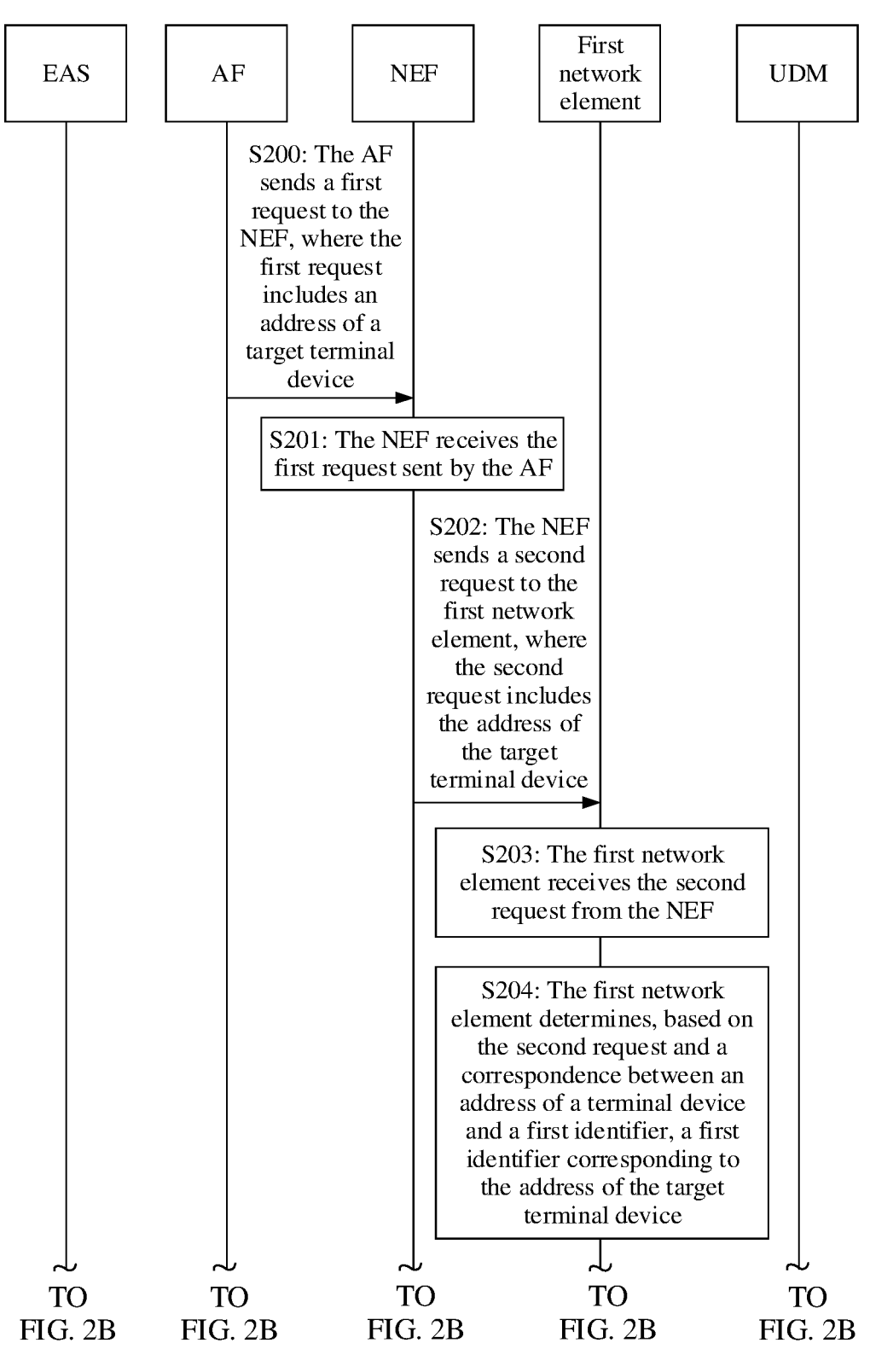
FIG. 2A and FIG. 2B are a schematic flowchart of a first network capability exposure method according to this application.
Figure 2B:
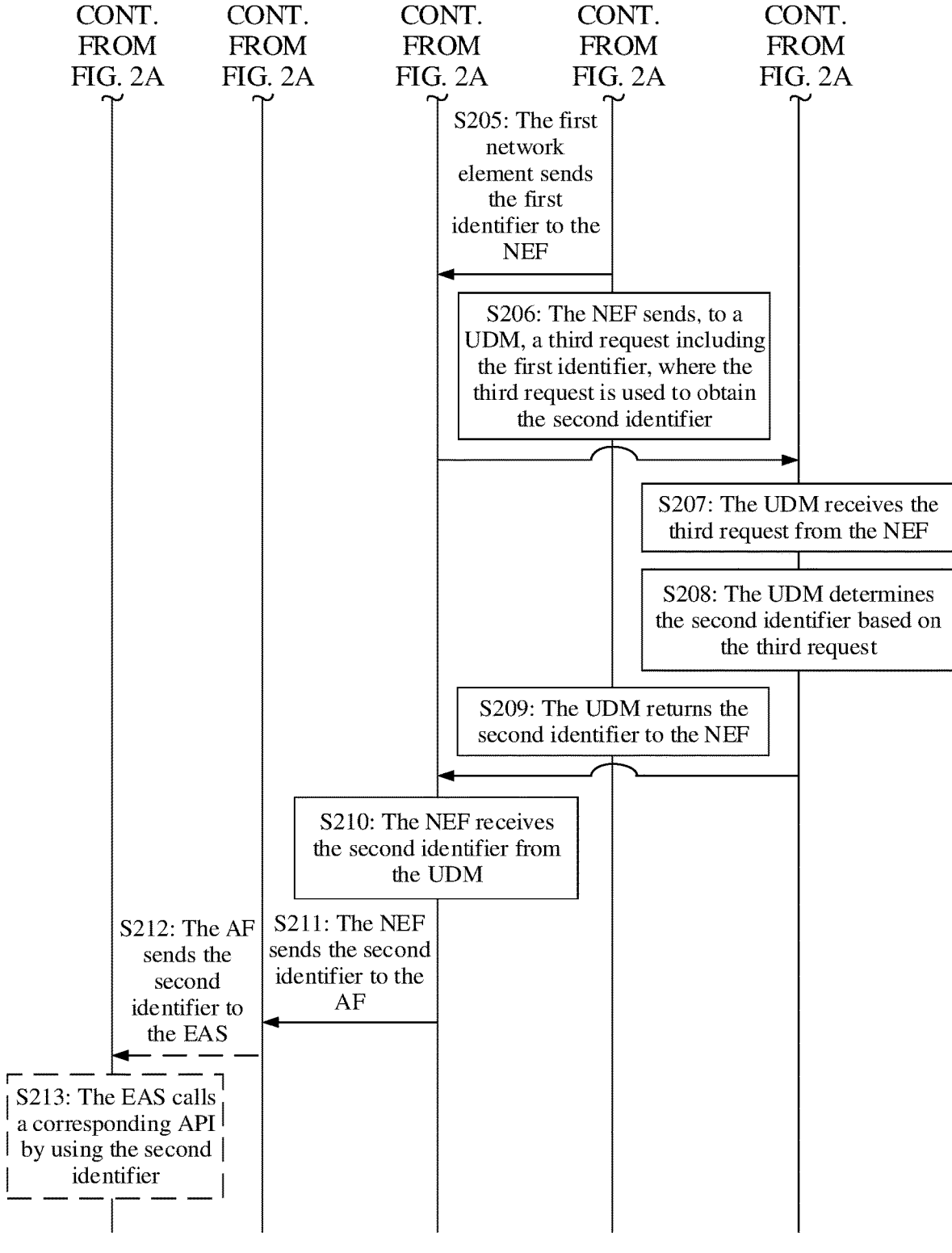

An embodiment of this application provides a first network capability exposure method based on a manner in which an AF obtains an identifier of a terminal device by interacting with a first network element via an NEF. As shown in FIG. 2A and FIG. 2B, a specific procedure includes the following steps.

S200: The AF sends a first request to the NEF, where the first request includes an address of a target terminal device.

In this embodiment of this application, the first request is used to obtain a second identifier that is of the target terminal device and that is for identifying the target terminal device outside a 3GPP system. The second identifier may be a GPSI.

In this embodiment of this application, a case in which the AF is triggered to send the first request to the NEF may be as follows:

The AF receives a fifth request sent by an EAS, where the fifth request is used to request the second identifier, and the fifth request includes the address of the target terminal device. Therefore, the AF determines the address of the target terminal device based on the received fifth request, and sends the first request to the NEF.

Further, in an optional manner in this embodiment of this application, before the EAS sends a second request to the AF, after the target terminal device establishes a PDU session, when the target terminal device needs to initiate an application-related service, the target terminal device establishes a connection to the EAS based on the PDU session, so that the EAS provides the application-related service to the terminal device.

Based on the established connection between the UE and the EAS, the EAS may obtain the address of the target terminal device.

Further, the EAS may provide the address of the target terminal device to the AF, and request the second identifier of the target terminal device from the AF.

Preferably, in this embodiment of this application, the first request further carries an application identifier (Application ID), so that when one address of UE corresponds to a plurality of second identifiers, one of the second identifiers is determined based on the application identifier.

S201: The NEF receives a first request sent by the AF.

S202: The NEF sends a second request to the first network element, where the second request includes the address of the target terminal device.

In this embodiment of this application, the second request is used to request a first identifier for identifying the target terminal device in the 3GPP system. The first identifier may be an SUPI, or may be an internal mobile subscriber identity (International Mobile Subscriber Identity, IMSI) of the target terminal device in a 4G system.

Further, in this embodiment of this application, the first network element is a PCF network element or a UPF network element.

When the first network element is the UPF network element, optionally, both the NEF and the UPF are locally deployed network elements. In other words, both the NEF and the UPF are deployed at a network edge to provide an MEC service to the target terminal device.

When the first network element is the PCF network element, before sending the second request to the first network element, the NEF further needs to determine the PCF serving the target terminal device.

Further, in an optional manner in this embodiment of this application, the NEF may determine, in the following manners, the PCF serving the target terminal device:

S202a: The NEF sends a fourth request to a BSF, where the fourth request is used to obtain an address of the PCF serving the target terminal device.

In an optional manner in this embodiment of this application, the fourth request includes the address of the target terminal device.

Specifically, the NEF provides the address of the target terminal device to the BSF by invoking a BSF management discovery Nbsf_Management_Discovery service-based operation, to request the address of the PCF serving the target terminal device.

S202b: The BSF determines, based on the address of the target terminal device and a correspondence between an address of a terminal device and a PCF, the address of the PCF serving the target terminal device.

S202c: The BSF notifies the NEF of the address of the PCF.

S202d: The NEF receives the address of the PCF from the BSF.

It should be noted that when there is only one PCF, S202a to S202d may be omitted, that is, the NEF directly sends the second request only to the PCF that exists.

S203: The first network element receives the second request from the NEF.

In this embodiment of this application, the second request is determined by the NEF based on the received first request.

In an optional method in this embodiment of this application, after receiving the first request from the AF, the NEF generates the second request based on the address of the target terminal device in the first request.

S204: The first network element determines, based on the second request and a correspondence between an address of a terminal device and a first identifier, the first identifier corresponding to the address of the target terminal device.

For example, it is assumed that the address of the target terminal device included in the second request is IP2, and the correspondence between an address of a terminal device and a first identifier is shown in Table 1 below. Therefore, the first network element may learn, by searching Table 1, that a first identifier corresponding to IP2 is S2.

TABLE 1

| Correspondence between an address of a terminal device and a first identifier | |
|---|---|
| First identifier (SUPI) | Address of a terminal device |
| S1 | IP1 |
| S2 | IP2 |
| S3 | IP3 |

The correspondence between an address of a terminal device and a first identifier may be locally stored in the first network element; or the correspondence between an address of a terminal device and a first identifier may be stored in a third-party platform. After receiving the second request, the first network element invokes the correspondence between an address of a terminal device and a first identifier from the third-party platform.

S205: The first network element sends the first identifier to the NEF.

In a preferred method in this embodiment of this application, when the first network element is the UPF network element, before sending the first identifier to the NEF, the UPF needs to determine that authorization from an SMF is obtained.

For example, the SMF may indicate in advance whether the UPF can provide the first identifier to the NEF, or the UPF temporarily obtains authorization from the SMF after receiving the second request from the NEF.

S206: The NEF sends a third request including the first identifier to a UDM, where the third request is used to obtain the second identifier.

In an optional manner in this embodiment of this application, the NEF performs identifier conversion by invoking an Nudm_SDM_Get service-based operation.

Further, the third request may further include the application ID.

S207: The UDM receives the third request from the NEF.

S208: The UDM determines the second identifier based on the third request.

Further, in this embodiment of this application, there are a plurality of methods for determining the second identifier by the UDM based on the third request, and this is not specifically limited to the following several methods.

Determining manner 1: The UDM stores a correspondence between a first identifier and a second identifier, and the UDM determines the second identifier based on the received first identifier and the correspondence between a first identifier and a second identifier.

For example, it is assumed that the correspondence that is between a first identifier and a second identifier and that is stored in the UDM is shown in the following Table 2, and the first identifier included in the third request received by the UDM is S2. Therefore, the UDM may learn, by searching Table 2, that a second identifier corresponding to S2 is G2.

TABLE 2

| Correspondence 1 between a first identifier and a second identifier | |
|---|---|
| First identifier (SUPI) | Second identifier (GPSI) |
| S1 | G1 |
| S2 | G2 |
| S3 | G3 |

Determining manner 2: The UDM obtains a correspondence between a first identifier and a second identifier from a third-party platform, and the UDM determines the second identifier based on the received first identifier and the correspondence between a first identifier and a second identifier.

In addition, if the third request further includes the application ID, the UDM may determine the corresponding second identifier with reference to the application ID and the first identifier.

For example, in the correspondence between a first identifier and a second identifier, the first identifier may correspond to a plurality of second identifiers. For example, the correspondence between a first identifier and a second identifier is shown in the following Table 3.

TABLE 3

| Correspondence 2 between a first identifier and a second identifier | |
|---|---|
| First identifier (SUPI) | Second identifier (GPSI) |
| S1 | G1 |
| S2 | G2 |
| | G3 |
| | G4 |
| S3 | G5 |
| | G6 |

It is assumed that the first identifier included in the third request received by the UDM is S2, and the UDM may learn, by searching Table 3, that second identifiers corresponding to S2 are G2, G3, and G4. If the third request further includes the application ID, the UDM may further determine, based on a correspondence between an application ID and a second identifier, the second identifier corresponding to the target terminal device.

For example, the application ID included in the third request is an application ID 3, and the correspondence between an application ID and a second identifier is shown in the following Table 4. In this case, the UDM may determine, by searching Table 4, that the second identifier corresponding to the application ID 3 is G4. Therefore, the UDM determines that the second identifier of the target terminal device is G4.

TABLE 4

| Correspondence between an application ID and a second identifier | |
| --- | --- |
| Second identifier (GPSI) | Application ID |
| G2 | Application ID1 |
| G3 | Application ID2 |
| G4 | Application ID3 |

S209: The UDM returns the second identifier to the NEF.

S210: The NEF receives the second identifier from the UDM.

S211: The NEF sends the second identifier to the AF.

In this embodiment of this application, the second identifier is used to expose an application programming interface (API) corresponding to the second identifier.

Specifically, the AF may invoke, based on the second identifier, the API interface provided by the NEF, or may provide, based on the second identifier, the API interface for the EAS connected to the target terminal device, for the EAS to invoke.

According to the foregoing method, in this embodiment of this application, the AF can actively obtain the second identifier of the target terminal device, to provide the second identifier of the target terminal device to the EAS, so that the EAS can call the corresponding API by using the second identifier.

Based on the scenario 1, an embodiment of this application further provides a second network capability exposure method. The following specifically describes a process of the second network capability exposure method provided in this embodiment of this application. As shown in FIG. 3A and FIG. 3B, a specific procedure includes the following steps.

S300: An AF sends a first request to an NEF, where the first request includes an address of a target terminal device and first information of the target terminal device.

The first information is information provided by the AF to a 3GPP system, and may be used by the 3GPP system or a 5G system to perform an operation on the target terminal device.

Content included in the first information in this embodiment of this application is not specifically limited to a part or all of the following:

5G local area network group information, predicted behavior information of the target terminal device, and a network configuration parameter of the target terminal device.

In this embodiment of this application, a case in which the AF is triggered to send the first request to the NEF may be as follows:

Before an EAS sends a second request to the AF, after the target terminal device establishes a PDU session, when the target terminal device needs to initiate an application-related service, the target terminal device establishes a connection to the EAS based on the PDU session, so that the EAS provides the application-related service to the target terminal device.

Based on the established connection between the target terminal device and the EAS, the EAS may obtain the address of the target terminal device.

Further, the EAS provides the address of the target terminal device to the AF, and the AF may provide the first information to the 3GPP system through an API provided by the NEF, so that the 3GPP system can provide a corresponding network condition for an application.

S301: The NEF receives the first request sent by the AF, where the first request includes the address of the target terminal device and the first information of the target terminal device.

S302: The NEF sends a second request to a first network element, where the second request includes the address of the target terminal device.

In this embodiment of this application, the second request is used to request a first identifier for identifying the target terminal device in the 3GPP system. The first identifier may be an SUPI, or may be an IMSI of the target terminal device in a 4G system.

In this embodiment of this application, the second request is determined by the NEF based on the received first request.

Further, in this embodiment of this application, the first network element is a PCF network element or a UPF network element.

When the first network element is the PCF network element, before sending the second request to the first network element, the NEF further needs to determine the PCF serving the target terminal device. For a method for determining, by the NEF, the PCF serving the target terminal device, refer to S202a to S202d. For brevity, details are not described herein again. It should be noted that when there is only one PCF, the NEF does not need to perform S202a to S202d, that is, may directly send the second request only to the PCF that exists.

When the first network element is the UPF network element, optionally, both the NEF and the UPF are locally deployed network elements. In other words, both the NEF and the UPF are deployed at a network edge to provide an MEC service to the target terminal device.

S303: The first network element receives the second request from the NEF.

S304: The first network element determines, based on the second request and a correspondence between an address of a terminal device and a first identifier, the first identifier corresponding to the address of the target terminal device.

A method for determining, by the first network element, the first identifier corresponding to the address of the target terminal device is similar to that described in S204. For details, refer to the descriptions of S204. Details are not described herein again.

S305: The first network element sends the first identifier to the NEF.

In a preferred method in this embodiment of this application, when the first network element is the UPF network element, before sending the first identifier to the NEF, the UPF needs to determine that authorization from an SMF is obtained.

The SMF may indicate in advance whether the UPF can provide the first identifier to the NEF, or the UPF temporarily obtains authorization from the SMF after receiving the second request from the NEF.

S306: The NEF sends a third request to a second network element, where the third request includes the first identifier and the first information.

The third request is generated by the NEF based on the first identifier and the first information.

In this embodiment of this application, the third request indicates to store the first information.

In an optional manner in this embodiment of this application, the first information is network capability exposure information of the target terminal device.

In an optional manner in this embodiment of this application, the second network element is a UDM, or the second network element is an NWDAF.

S307: The second network element receives the third request, and stores the first information.

In this embodiment of this application, when the second network element is the UDM, after receiving the third request, the UDM indicates a third network element to store the first information. The third network element is one of an AMF network element, an SMF network element, or a unified data repository (Unified Data Repository, UDR) network element.

For example, if the second network element is the UDM, and the third network element is the UDR, after receiving the third request, the UDM provides the first identifier to the UDR, to indicate the UDR to store the first information corresponding to the first identifier.

For example, when the second network element is the UDM, the third network element is the AMF, and the first information is an estimated movement track of the target terminal device, after receiving the third request, the UDM provides the first identifier and the first information to the AMF, so that the AMF that receives the first identifier and the first information performs paging optimization processing, that is, the AMF can page the target terminal device in a smaller area range.

Optionally, the third request may alternatively be used to update stored information to the first information.

According to the foregoing method, in this embodiment of this application, the NEF can obtain the second identifier of the target terminal device, to expose the first information of the target terminal device to another network element by using the second identifier of the target terminal device, and further provide an API based on the address of the terminal device to the AF. This is conducive to exposure of the first information based on the address of the terminal device by the AF and obtaining of the first information of the target terminal device by another network element, to effectively expose and share network capability information.

Figure 4A:
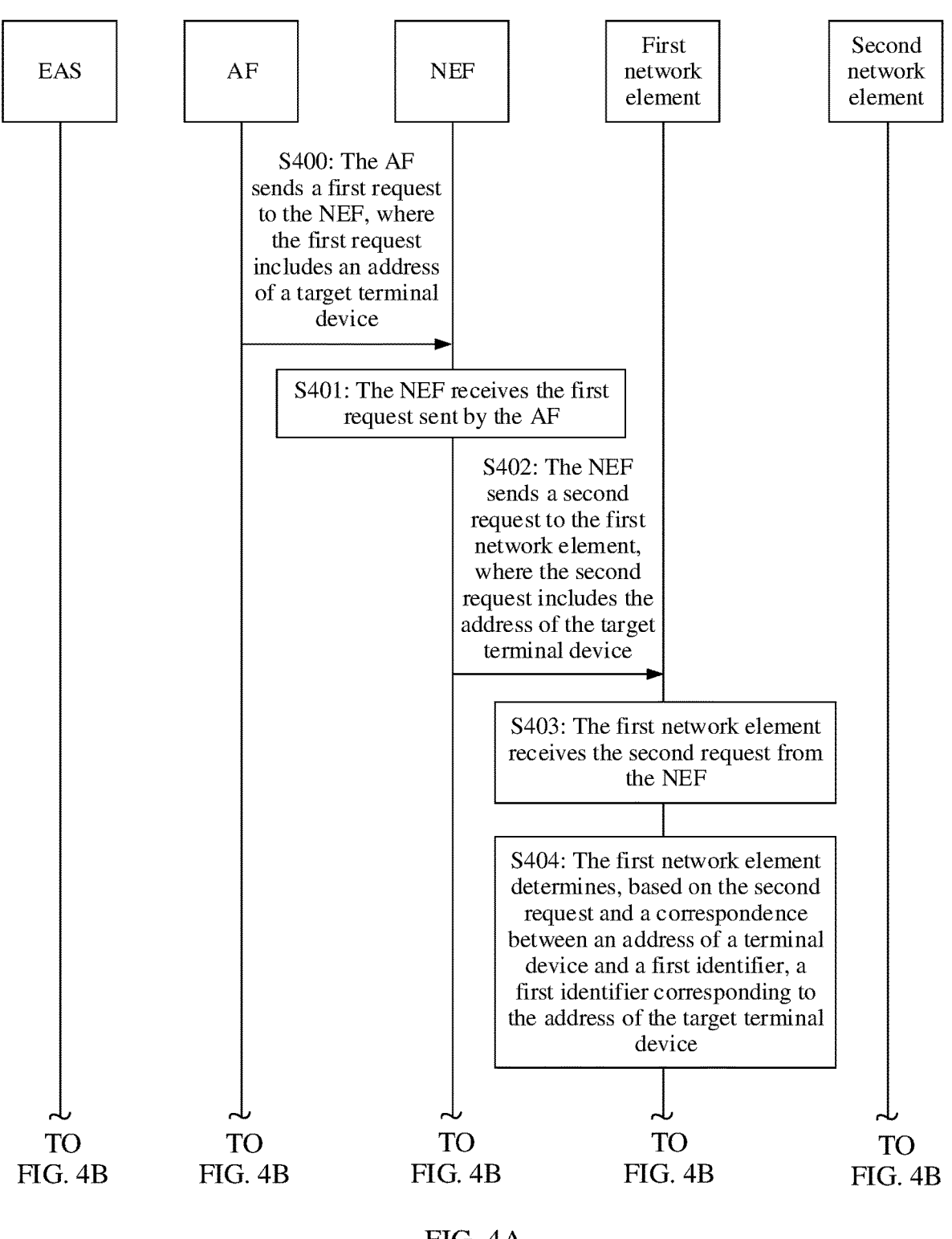
FIG. 4A and FIG. 4B are a schematic flowchart of a third network capability exposure method according to this application.
Figure 4B:
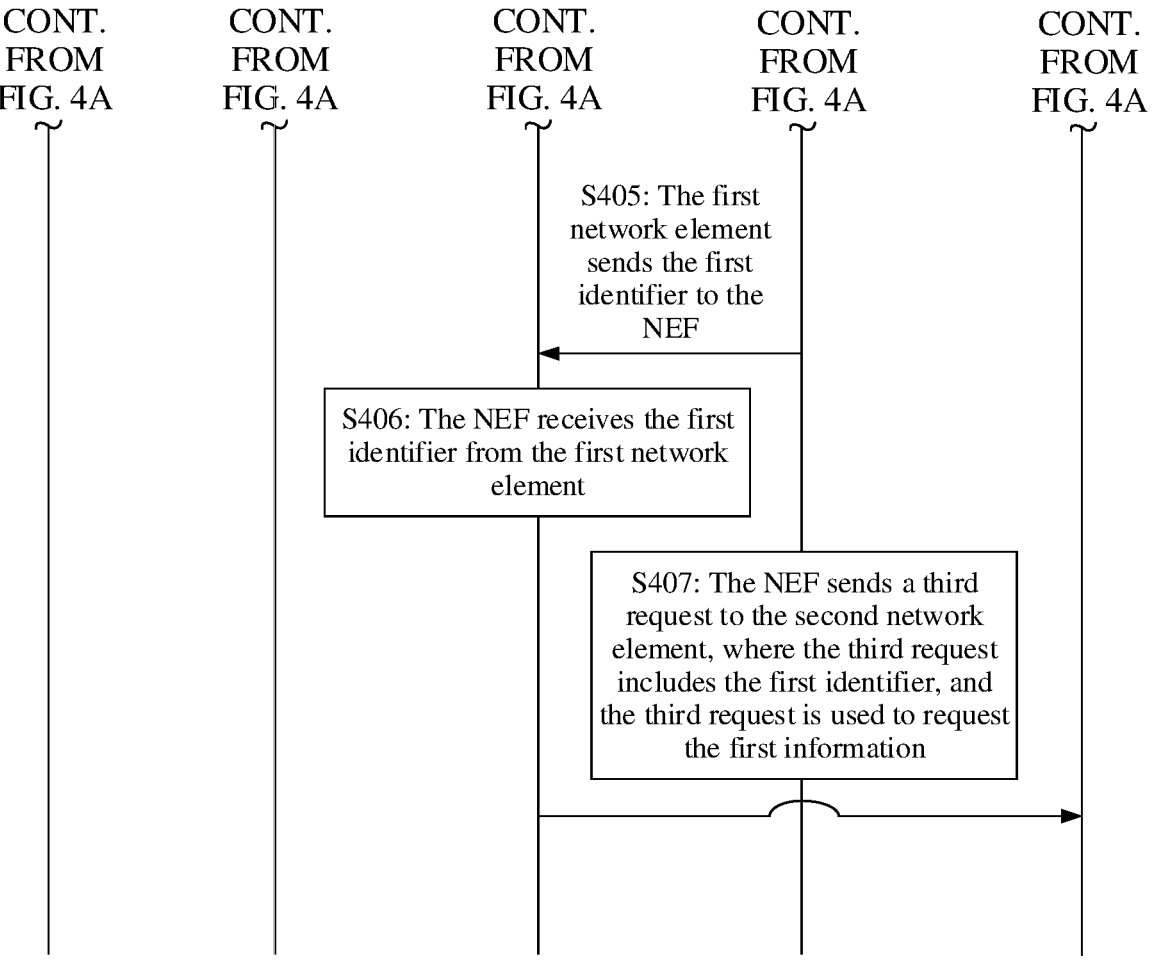

Based on the scenario 1, an embodiment of this application further provides a third network capability exposure method. The following specifically describes a process of the third network capability exposure method provided in this embodiment of this application. As shown in FIG. 4A and FIG. 4B, a specific procedure includes the following steps.

S400: An AF sends a first request to an NEF, where the first request includes an address of a target terminal device.

The first request is used to request first information of the target terminal device from a 3GPP system (for example, request to subscribe to the first information, or request to unsubscribe from the first information).

In an optional manner in this embodiment of this application, content included in the first information is not specifically limited to a part or all of the following: a location of the target terminal device, a congestion status of a cell in which the target terminal device is located, and a quality of service monitoring result of the target terminal device.

In this embodiment of this application, a case in which the AF is triggered to send the first request to the NEF may be as follows:

Before an EAS sends a second request to the AF, after the target terminal device establishes a PDU session, when the target terminal device needs to initiate an application-related service, the target terminal device establishes a connection to the EAS based on the PDU session, so that the EAS provides the application-related service to the terminal device.

Based on the established connection between the UE and the EAS, the EAS may obtain the address of the target terminal device.

Further, the EAS provides the address of the target terminal device to the AF, and the AF may send the first request to the 3GPP system through an API provided by the NEF, for example, request to subscribe to information related to the target terminal device, or cancel subscribed information related to the target terminal device.

S401: The NEF receives the first request sent by the AF.

S402: The NEF sends a second request to a first network element, where the second request includes the address of the target terminal device.

In this embodiment of this application, the second request is used to request a first identifier for identifying the target terminal device in the 3GPP system. The first identifier may be an SUPI, or may be an IMSI of the target terminal device in a 4G system.

In this embodiment of this application, the second request is determined by the NEF based on the received first request.

Further, in this embodiment of this application, the first network element is a PCF network element or a UPF network element.

When the first network element is the PCF network element, before sending the second request to the first network element, the NEF further needs to determine the PCF serving the target terminal device. For a method for determining, by the NEF, the PCF serving the target terminal device, refer to S202a to S202d. For brevity, details are not described herein again. It should be noted that when there is only one PCF, the NEF does not need to perform S202a to S202d, that is, may directly send the second request only to the PCF that exists.

When the first network element is the UPF network element, optionally, both the NEF and the UPF are locally deployed network elements. In other words, both the NEF and the UPF are deployed at a network edge to provide an MEC service to the target terminal device.

S403: The first network element receives the second request from the NEF.

S404: The first network element determines, based on the second request and a correspondence between an address of a terminal device and a first identifier, the first identifier corresponding to the address of the target terminal device.

A method for determining, by the first network element, the first identifier corresponding to the address of the target terminal device is similar to that described in S204. For details, refer to the descriptions of S204. Details are not described herein again.

S405: The first network element sends the first identifier to the NEF.

In a preferred method in this embodiment of this application, when the first network element is the UPF network element, before sending the first identifier to the NEF, the UPF needs to determine that authorization from an SMF is obtained.

The SMF may indicate in advance whether the UPF can provide the first identifier to the NEF, or the UPF temporarily obtains authorization from the SMF after receiving the second request from the NEF.

S406: The NEF receives the first identifier from the first network element.

S407: The NEF sends a third request to a second network element, where the third request includes the first identifier.

In this embodiment of this application, the third request is used to request the first information.

In an optional manner in this embodiment of this application, the second network element is a UDM, or the second network element is an NWDAF.

Further, when the second network element is the UDM, the third request is used by the NEF to request the first information from a third network element via the UDM (for example, request to subscribe to the first information, or request to unsubscribe from the first information).

When the second network element is the NWDAF, the third request is used by the NEF to request the first information from the NWDAF (for example, request to subscribe to the first information, or request to unsubscribe from the first information).

In an optional manner in this embodiment of this application, the third network element is one of an AMF network element, an SMF network element, or a UDR.

Scenario 2: Interaction between an AF and a first network element does not need to be performed via an NEF.

Preferably, the AF in the scenario 2 is a trusted AF. To be specific, the AF, like network elements such as a PCF and a UDM, is also deployed by an operator, and may directly communicate with the PCF or the UDM without using the NEF. In this scenario, the communication system may not include the NEF network element.

Figure 5:
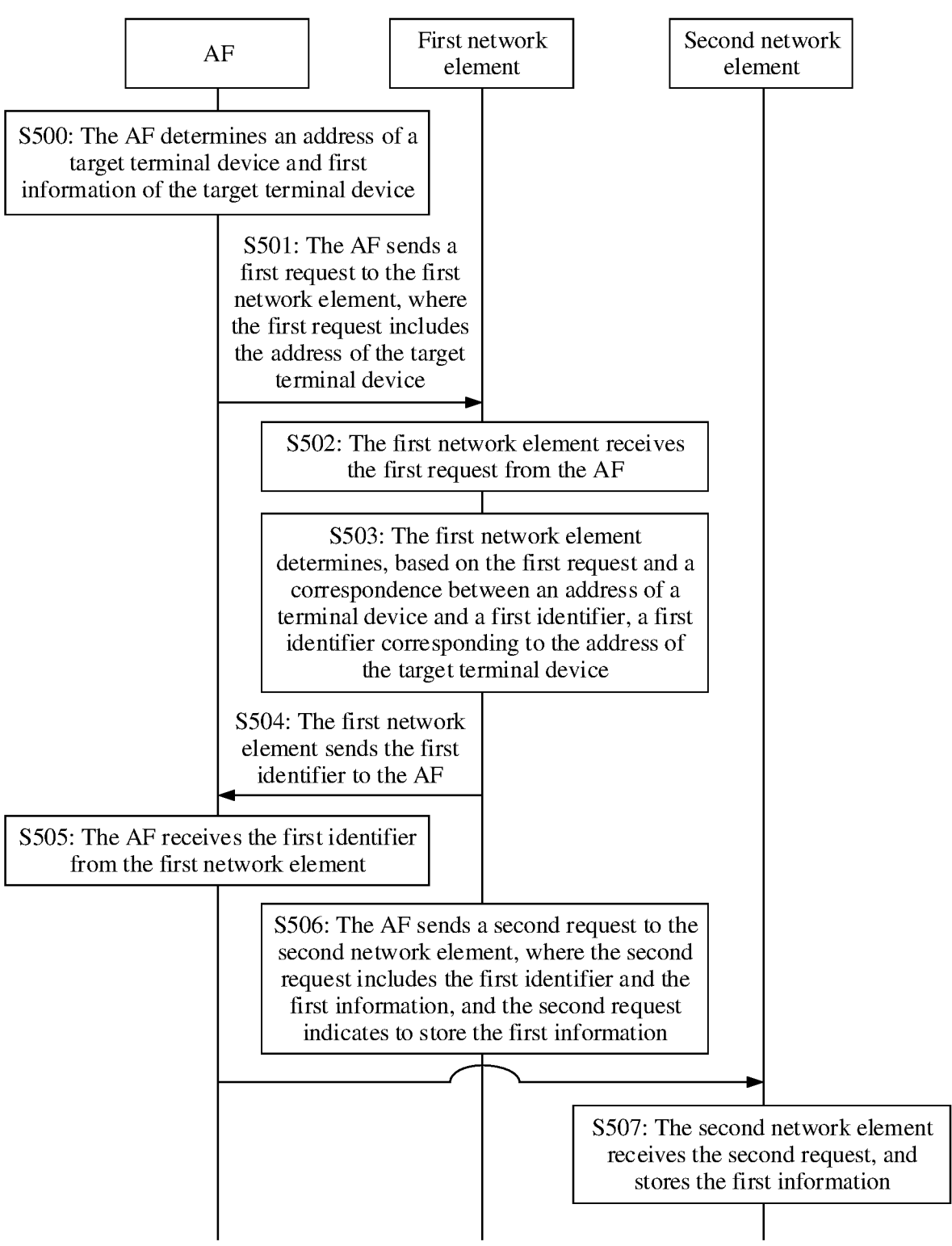
FIG. 5 is a schematic flowchart of a fourth network capability exposure method according to this application.

Based on the scenario 2, the following specifically describes a process of a fourth network capability exposure method provided in this embodiment of this application. As shown in FIG. 5, a specific procedure includes the following steps.

S500: An AF determines an address of a target terminal device and first information of the target terminal device.

The first information is information provided by the AF to a 3GPP system, and may be used by the 3GPP system to perform an operation on the target terminal device.

Content included in the first information in this embodiment of this application is not specifically limited to a part or all of the following: 5G local area network group information, predicted behavior information of the target terminal device, and a network configuration parameter of the target terminal device.

In an optional manner in this embodiment of this application, the AF determines the address of the target terminal device and the first information based on a received third request sent by an EAS, where the third request includes the address of the target terminal device and the first information.

Further, in an optional manner in this embodiment of this application, before the EAS sends the third request to the AF, after the target terminal device establishes a PDU session, when the target terminal device needs to initiate an application-related service, the target terminal device establishes a connection to the EAS based on the PDU session, so that the EAS provides the application-related service to the target terminal device.

Based on the established connection between the target terminal device and the EAS, the EAS may obtain the address of the target terminal device and the first information. The EAS provides the address of the target terminal device and the first information to the AF.

S501: The AF sends a first request to a first network element, where the first request includes the address of the target terminal device.

In this embodiment of this application, the first request is used to request a first identifier for identifying the target terminal device in the 3GPP system. The first identifier may be an SUPI, or may be an IMSI of the target terminal device in a 4G system.

Further, in this embodiment of this application, the first network element is a PCF network element.

When the first network element is the PCF network element, before sending the second request to the first network element, the NEF further needs to determine the PCF serving the target terminal device. For a method for determining, by the NEF, the PCF serving the target terminal device, refer to S202a to S202d. For brevity, details are not described herein again. It should be noted that when there is only one PCF, the NEF does not need to perform S202a to S202d, that is, may directly send the second request only to the PCF that exists.

S502: The first network element receives the first request from the AF.

S503: The first network element determines, based on the first request and a correspondence between an address of a terminal device and a first identifier, the first identifier corresponding to the address of the target terminal device.

Content of determining, by the first network element, the first identifier corresponding to the address of the target terminal device is similar to that described in S204. For details, refer to the descriptions of S204. Details are not described herein again.

S504: The first network element sends the first identifier to the AF.

S505: The AF receives the first identifier from the first network element.

S506: The AF sends a second request to a second network element, where the second request includes the first identifier and the first information.

The second request is generated by the AF based on the first identifier and the first information.

In this embodiment of this application, the second request indicates to store the first information.

In an optional manner in this embodiment of this application, the second network element is a UDM, or the second network element is an NWDAF.

S507: The second network element receives the second request, and stores the first information.

In this embodiment of this application, when the second network element is the UDM, after receiving the second request, the UDM indicates a third network element to store the first information. The third network element is one of an AMF network element, an SMF network element, or a UDR.

For example, if the second network element is the UDM, and the third network element is the UDR, after receiving the third request, the UDM provides the first identifier to the UDR, to indicate the UDR to store the first information corresponding to the first identifier.

For example, when the second network element is the UDM, the third network element is the AMF, and the first information is an estimated movement track of the target terminal device, after receiving the third request, the UDM provides the first identifier and the first information to the AMF, so that the AMF that receives the first identifier and the first information performs paging optimization processing, that is, the AMF can page the target terminal device in a smaller area range.

Optionally, the third request may alternatively be used to update stored information to the first information.

According to the foregoing method, in this embodiment of this application, the AF can actively obtain the second identifier of the target terminal device, to expose the first information of the target terminal device to another network element by using the second identifier of the target terminal device. This is conducive to obtaining of the first information of the target terminal device by the another network element, and can ensure exchange of network information related to the terminal device, and ensure service experience of the terminal device.

Figure 6:
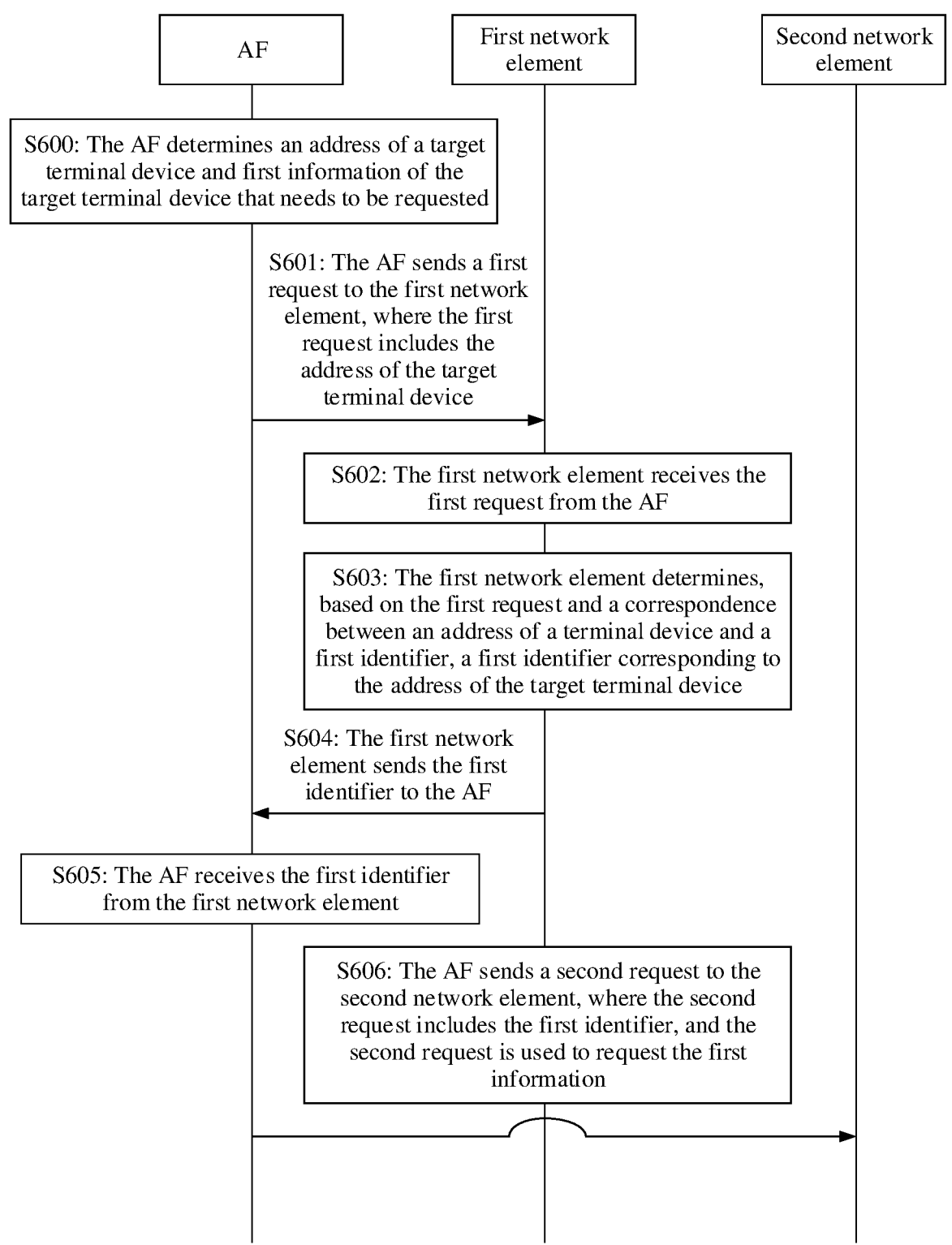
FIG. 6 is a schematic flowchart of a fifth network capability exposure method according to this application.

Based on the scenario 2, an embodiment of this application further provides another network capability exposure method. The following specifically describes a process of a fifth network capability exposure method provided in this embodiment of this application. As shown in FIG. 6, a specific procedure includes the following steps.

S600: An AF determines an address of a target terminal device and first information of the target terminal device that needs to be obtained.

In an optional manner in this embodiment of this application, content included in the first information is not specifically limited to a part or all of the following: a location of the target terminal device, a congestion status of a cell in which the target terminal device is located, and a quality of service monitoring result of the target terminal device.

In an optional manner in this embodiment of this application, the AF determines the address of the target terminal device and the first information based on a received third request sent by an EAS, where the third request includes the address of the target terminal device and the first information.

S601: The AF sends a first request to a first network element, where the first request includes the address of the target terminal device.

In this embodiment of this application, the second request is used to request a first identifier for identifying the target terminal device in the 3GPP system. The first identifier may be an SUPI, or may be an IMSI of the target terminal device in a 4G system.

For details about a case in which the AF is triggered to send the first request to the first network element in this embodiment of this application, refer to the descriptions in S500. For brevity, details are not described herein again.

Further, in this embodiment of this application, the first network element is a PCF network element.

When the first network element is the PCF network element, before sending the second request to the first network element, the NEF further needs to determine the PCF serving the target terminal device. For a method for determining, by the NEF, the PCF serving the target terminal device, refer to S202a to S202d. For brevity, details are not described herein again. It should be noted that when there is only one PCF, the NEF does not need to perform S202a to S202d, that is, may directly send the second request only to the PCF that exists.

S602: The first network element receives the first request from the AF.

S603: The first network element determines, based on the first request and a correspondence between an address of a terminal device and a first identifier, the first identifier corresponding to the address of the target terminal device.

Content of determining, by the first network element, the first identifier corresponding to the address of the target terminal device is similar to that described in S204. For details, refer to the descriptions of S204. Details are not described herein again.

S604: The first network element sends the first identifier to the AF.

S605: The AF receives the first identifier from the first network element.

S606: The AF sends a second request to a second network element, where the second request includes the first identifier.

In this embodiment of this application, the second request is used to request the first information (for example, request to subscribe to the first information, or request to unsubscribe from the first information).

In an optional manner in this embodiment of this application, the second network element is a UDM, or the second network element is an NWDAF.

Further, when the second network element is the UDM, the second request is used by the NEF to request the first information from a third network element via the UDM (for example, request to subscribe to the first information, or request to unsubscribe from the first information).

When the second network element is the NWDAF, the second request is used by the NEF to request the first information from the NWDAF (for example, request to subscribe to the first information, or request to unsubscribe from the first information).

In an optional manner in this embodiment of this application, the third network element is one of an AMF network element, an SMF network element, or a UDR.

Based on the foregoing descriptions of the solutions in this application, it may be understood that, to implement the foregoing functions, the foregoing devices include corresponding hardware structures and/or software modules for executing the functions. A person of ordinary skill in the art should easily be aware that, in combination with the example units and algorithm steps described in the embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figures 7, 8:
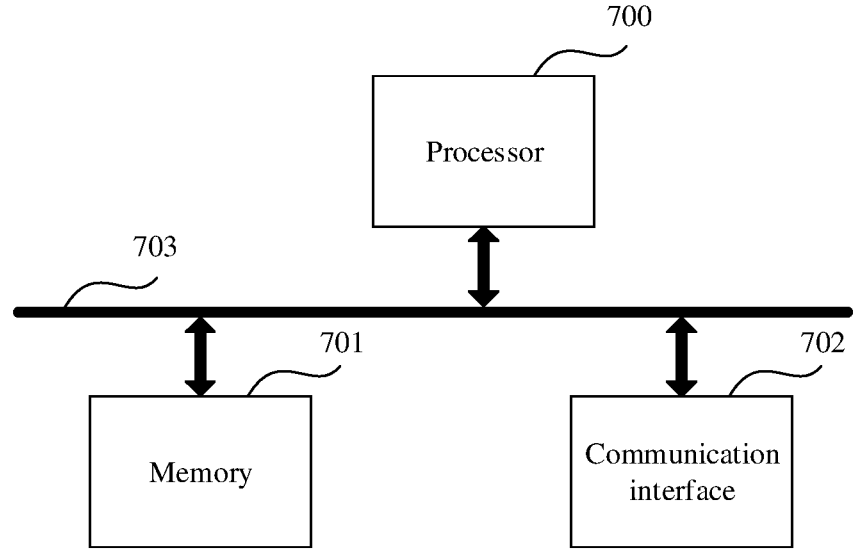
FIG. 7 is a schematic diagram of a network capability exposure apparatus according to this application.
FIG. 8 is a schematic diagram of another network capability exposure apparatus according to this application.

Based on the foregoing embodiments, as shown in FIG. 7, an embodiment of this application further provides a network capability exposure apparatus. The apparatus includes a processor 700, a memory 701, and a communication interface 702.

The processor 700 is responsible for managing a bus architecture and general processing, and the memory 701 may store data used when the processor 700 performs an operation. The communication interface 702 is configured to perform data communication between the processor 700 and the memory 701.

The processor 700 may be a central processing unit (CPU), a network processor (NP), or a combination of a CPU and an NP. The processor 700 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof. The memory 701 may include: any medium that can store program code, such as a USB flash drive, a removable hard disk, a read-only memory (ROM), a random access memory (RAM), a magnetic disk, or a compact disc.

The processor 700, the memory 701, and the communication interface 702 are connected to each other. Optionally, the processor 700, the memory 701, and the communication interface 702 may be connected to each other by using a bus 703. The bus 703 may be a peripheral component interconnect (PCI) bus, an extended industry standard architecture (EISA) bus, or the like. The bus may be classified into an address bus, a data bus, a control bus, and the like. For ease of representation, only one bold line is used for representation in FIG. 7, but this does not mean that there is only one bus or only one type of bus.

When the network capability exposure apparatus is an AF, the processor 700 is configured to: read a program in the memory 701, and perform the method procedure performed by the AF in S200 to S213 shown in FIG. 2A and FIG. 2B; perform the method procedure performed by the AF in S300 to S307 shown in FIG. 3A and FIG. 3B; perform the method procedure performed by the AF in S400 to S407 shown in FIG. 4A and FIG. 4B; perform the method procedure performed by the AF in S500 to S507 shown in FIG. 5; or perform the method procedure performed by the AF in S600 to S606 shown in FIG. 6.

When the network capability exposure apparatus is the NEF, the processor 700 is configured to: read a program in the memory 701, and perform the method procedure performed by the NEF in S200 to S213 shown in FIG. 2A and FIG. 2B; perform the method procedure performed by the NEF in S300 to S307 shown in FIG. 3A and FIG. 3B; or perform the method procedure performed by the NEF in S400 to S407 shown in FIG. 4A and FIG. 4B.

As shown in FIG. 8, the present invention provides a network capability exposure apparatus. The network capability exposure apparatus includes at least one processing unit 800, at least one storage unit 801, and at least one communication unit 802. The communication unit 802 is configured to receive and send data under control of the processing unit 800, and the storage unit 801 stores program code.

In an optional manner in this embodiment of this application, the network capability exposure apparatus is an NEF, and when the program code is executed by the processing unit 800, the processing unit 800 is enabled to perform the following process: receiving, by using the communication unit 802, a first request from an application function network element, where the first request includes an address of a target terminal device; sending a second request to a first network element by using the communication unit 802, where the second request includes the address of the target terminal device, and the second request is used to request a first identifier for identifying the target terminal device in a 3rd Generation Partnership Project 3GPP system; receiving, by using the communication unit 802, the first identifier from the first network element; determining, based on the first identifier, a second identifier for identifying the target terminal device outside the 3GPP system; and sending the second identifier to the application function network element by using the communication unit 802, where the second identifier is used to expose an application programming interface corresponding to the second identifier.

In an optional manner in this embodiment of this application, the network capability exposure apparatus is an NEF, and when the program code is executed by the processing unit 800, the processing unit 800 is enabled to perform the following process: receiving, by using the communication unit 802, a first request sent by an application function network element, where the first request includes an address of a target terminal device and first information of the target terminal device; sending a second request to a first network element, where the second request includes the address of the target terminal device, and the second request is used to request a first identifier for identifying the target terminal device in a 3GPP system; receiving the first identifier from the first network element; and sending a third request to a second network element, where the third request includes the first identifier and the first information, and the third request indicates to store the first information.

In an optional manner in this embodiment of this application, the network capability exposure apparatus is an NEF, and when the program code is executed by the processing unit 800, the processing unit 800 is enabled to perform the following process: receiving, by using the communication unit 802, a first request sent by an application function network element, where the first request includes an address of a target terminal device, and the first request is used to request first information of the target terminal device from a 3rd Generation Partnership Project 3GPP system; sending a second request to a first network element by using the communication unit 802, where the second request includes the address of the target terminal device, and the second request is used to request a first identifier for identifying the target terminal device in the 3GPP system; receiving the first identifier from the first network element by using the communication unit 802; and sending a third request to a second network element by using the communication unit 802, where the third request includes the first identifier, and the third request is used to request the first information.

In an optional manner in this embodiment of this application, the network capability information exposure apparatus is an AF, and when the program code is executed by the processing unit 800, the processing unit 800 is enabled to perform the following process: sending a first request to a first network element by using the communication unit 802, where the first request includes an address of a target terminal device, and the first request is used to request a first identifier for identifying the target terminal device in a 3GPP system; receiving the first identifier from the first network element by using the communication unit 802; and sending a second request to a second network element by using the communication unit 802, where the second request includes the first identifier and first information, and the second request indicates to store the first information of the target terminal device.

In an optional manner in this embodiment of this application, the network capability exposure apparatus is an AF, and when the program code is executed by the processing unit 800, the processing unit 800 is enabled to perform the following process: sending a first request to a first network element by using the communication unit 802, where the first request includes an address of a target terminal device, and the first request is used to request a first identifier for identifying the target terminal device in a 3GPP system; receiving the first identifier from the first network element by using the communication unit 802; and sending a second request to a second network element by using the communication unit 802, where the second request includes the first identifier, and the second request indicates to request the first information.

In an optional manner in this embodiment of this application, the network capability exposure apparatus is an AF, and when the program code is executed by the processing unit 800, the processing unit 800 is enabled to perform the following process: sending a first request to an NEF by using the communication unit 802, where the first request includes an address of a target terminal device, and the first request is used to request a second identifier for identifying the target terminal device outside a 3GPP system; receiving the second identifier from the NEF by using the communication unit 802; and sending the second identifier to an EAS by using the communication unit 802, where the second identifier is used to expose an API interface corresponding to the second identifier.

In an optional manner in this embodiment of this application, the network capability exposure apparatus is a UDM, and when the program code is executed by the processing unit 800, the processing unit 800 is enabled to perform the following process: receiving, by using the communication unit 802, a request that is sent by an AF or an NEF and that is used to obtain a second identifier, where the request includes a first identifier used to identify the target terminal device in a 3GPP system, and the second identifier is used to identify the target terminal device outside the 3GPP system; determining the second identifier based on the first identifier and a correspondence between a first identifier and a second identifier; and feeding back the second identifier to the AF or the NEF by using the communication unit 802.

In an optional manner in this embodiment of this application, the network capability exposure apparatus is a UDM, and when the program code is executed by the processing unit 800, the processing unit 800 is enabled to perform the following process: receiving, by using the communication unit 802, a request that is sent by an AF or an NEF and that indicates to store first information of a target terminal device, where the request includes a first identifier of the target terminal device and the first information, and the first information is network capability exposure information provided by the AF to a 3GPP system; and indicating, based on the request, a third network element to store the first information.

In an optional manner in this embodiment of this application, the network capability exposure apparatus is a UDM, and when the program code is executed by the processing unit 800, the processing unit 800 is enabled to perform the following process: receiving, by using the communication unit 802, a request that is sent by the AF or the NEF and that indicates the AF to request to subscribe to or unsubscribe from first information from a 3GPP system, where the request includes the first information and a first identifier used to identify the target terminal device in the 3GPP system, and the first information is used to indicate the AF to request to subscribe to or unsubscribe from network capability exposure information from the 3GPP system; and subscribing to or unsubscribing from the first information from a third network element based on the request.

In an optional manner in this embodiment of this application, the network capability exposure apparatus is an NWDAF, and when the program code is executed by the processing unit 800, the processing unit 800 is enabled to perform the following process: receiving, by using the communication unit 802, a request that is sent by an AF or an NEF and that indicates to store first information of a target terminal device, where the request includes the first information and a first identifier used to identify the target terminal device in a 3GPP system, and the first information is used to indicate the AF to request to subscribe to or unsubscribe from network capability exposure information from a 3GPP system; and storing the first information based on the request.

In an optional manner in this embodiment of this application, the network capability exposure apparatus is an NWDAF, and when the program code is executed by the processing unit 800, the processing unit 800 is enabled to perform the following process: receiving, by using the communication unit 802, a request that is sent by the AF or the NEF and that indicates the AF to request to subscribe to or unsubscribe from first information from a 3GPP system, where the request includes the first information and a first identifier used to identify the target terminal device in the 3GPP system, and the first information is used to indicate the AF to request to subscribe to or unsubscribe from network capability exposure information from the 3GPP system; and subscribing to or unsubscribing from the first information according to the request.

Functions of the communication unit 802 and the processing unit 800 shown in FIG. 8 may be executed by the processor 700 by running a program in the memory 701, or may be independently executed by the processor 700.

The communication transmission apparatus shown in FIG. 8 may be the NEF network element in the foregoing embodiments, or a chip in the NEF network element; may be the AF network element in the foregoing embodiments, or a chip in the AF network element; may be the UDM network element in the foregoing embodiments, or a chip in the UDM network element; or may be the NWDAF network element in the foregoing embodiments, or a chip in the NWDAF network element.

In some possible implementations, aspects of the network capability exposure method provided in embodiments of the present invention may be further implemented in a form of a program product. The program product includes program code. When the program code is executed on a computer device, the program code is used to enable the computer device to perform the steps in the network capability exposure method according to various example implementations of the present invention described in this specification.

The program product may be any combination of one or more readable media. The readable medium may be a readable signal medium or a readable storage medium. For example, the readable storage medium may be, but is not limited to, an electrical, a magnetic, an optical, an electromagnetic, an infrared, or a semiconductor system, apparatus or device, or any combination thereof. More specific examples (a non-exhaustive list) of the readable storage medium include: an electrical connection having one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage component, a magnetic storage component, or any appropriate combination thereof.

A program product for performing network capability exposure in an implementation of the present invention may use a portable compact disc read-only memory (CD-ROM) and include program code, and may run on a server device. However, the program product of the present invention is not limited thereto. In this specification, the readable storage medium may be any tangible medium that includes or stores a program, and the program can be used by a network capability exposure apparatus or device, or used in combination with the apparatus or the device.

The readable signal medium may include a data signal propagated in a baseband or as a part of a cell, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted by using any appropriate medium, including but not limited to a wireless medium, a wired medium, an optical cable, an RF medium, or any appropriate combination thereof.

The program code used to execute the operations of the present invention may be written in any combination of one or more program design languages. The program design languages include object-oriented program design languages such as Java and C++, and further include a conventional procedural program design language such as a "C" language or a similar program design language. The program code may be completely executed on a computing device of a user, partially executed on user equipment, executed as an independent software package, partially executed on a computing device of a user and partially executed on a remote computing device, or completely executed on a remote computing device or server. When the program code is executed on the remote computing device, the remote computing device may be connected to the computing device of the user by using any type of network, including a local area network (LAN) or a wide area network (WAN), or may be connected to an external computing device.

An embodiment of this application further provides a computing device readable storage medium for a network capability exposure method performed by an NEF, that is, content is not lost after a power outage. The storage medium stores a software program including program code. When the program code is executed on a computing device, any solution for network capability exposure in the foregoing embodiments of this application can be implemented when the software program is read and executed by one or more processors.

An embodiment of this application further provides a computing device readable storage medium for a method for performing network capability exposure by an AF, that is, content is not lost after a power outage. The storage medium stores a software program including program code. When the program code is executed on a computing device, any solution for network capability exposure in the foregoing embodiments of this application can be implemented when the software program is read and executed by one or more processors.

The foregoing describes this application with reference to the block diagrams and/or flowcharts of the method, the apparatus (system), and/or the computer program product in embodiments of this application. It should be understood that a block of the block diagrams and/or flowcharts and a combination of blocks in the block diagrams and/or flowcharts can be implemented by using computer program instructions. These computer program instructions may be provided to a processor of a general-purpose computer, a processor of a dedicated computer, and/or another programmable data processing apparatus to produce a machine, so that the instructions executed by the processor of the computer and/or the another programmable data processing apparatus create a method for implementing a specific function/action in the block in the flowcharts and/or block diagrams.

Correspondingly, this application may further be implemented by using hardware and/or software (including firmware, resident software, microcode, and the like). Still further, this application may be in a form of a computer program product on a computer-usable or computer-readable storage medium. The computer program product has computer-usable or computer-readable program code implemented in the medium, to be used by an instruction execution system or used in combination with an instruction execution system. In the context of this application, the computer-usable or computer-readable medium may be any medium, and may include, store, communicate, transmit, or transfer a program, for use by an instruction execution system, apparatus, or device or used in combination with an instruction execution system, apparatus, or device.

Although this application is described with reference to specific features and embodiments thereof, it is clear that various modifications and combinations may be made to them without departing from the spirit and scope of this application. Correspondingly, the specification and the accompanying drawings are merely example descriptions of this application defined by the appended claims, and are considered as any of or all modifications, variations, combinations or equivalents that cover the scope of this application. It is clearly that, a person skilled in the art can make various modifications and variations to this application without departing from the scope of this application. In this way, this application is intended to cover these modifications and variations of this application provided that they fall within the scope of protection defined by the claims of this application and their equivalent technologies.

What is claimed is:

1. A method, comprising:
receiving, by a network exposure function network element, a first request from an application function network element, wherein the first request comprises an address of a target terminal device;
sending, by the network exposure function network element, a second request to a first network element, wherein the second request comprises the address of the target terminal device, and the second request requests a first identifier identifying the target terminal device in a 3rd Generation Partnership Project (3GPP) system;
receiving, by the network exposure function network element, the first identifier from the first network element;
determining, by the network exposure function network element based on the first identifier, a second identifier identifying the target terminal device outside the 3GPP system; and
sending, by the network exposure function network element, the second identifier to the application function network element, wherein the second identifier is used to expose an application programming interface corresponding to the second identifier.

2. The method according to claim 1, wherein determining, by the network exposure function network element based on the first identifier, the second identifier identifying the target terminal device outside the 3GPP system comprises:
sending, by the network exposure function network element to a unified data management network element, a third request comprising the first identifier; and
receiving, by the network exposure function network element, the second identifier from the unified data management network element, wherein the second identifier is obtained by the unified data management network element based on the third request and a correspondence between the first identifier and the second identifier.

3. The method according to claim 1, wherein the first identifier is a subscription permanent identifier of the target terminal device, and the second identifier is a generic public subscription identifier of the target terminal device.

4. The method according to claim 1, wherein the first network element is a user plane function network element.

5. The method according to claim 1, wherein the first network element is a policy control function network element.

6. The method according to claim 5, wherein before sending, by the network exposure function network element, the second request to the first network element, the method further comprises:

sending, by the network exposure function network element, a fourth request to a binding support function network element, wherein the fourth request requests an address of the policy control function network element serving the target terminal device; and receiving, by the network exposure function network element, the address of the policy control function network element from the binding support function network element.

7. The method according to claim 1, wherein the first request further comprises an application identifier.

8. A network capability exposure apparatus, comprising:

one or more processors; and a non-transitory memory;

wherein the one or more processors are configured to read a program in the memory to cause the network capability exposure apparatus to:

receive a first request from an application function network element, wherein the first request comprises an address of a target terminal device;

send a second request to a first network element, wherein the second request comprises the address of the target terminal device, and the second request requests a first identifier identifying the target terminal device in a 3rd Generation Partnership Project (3GPP) system;

receive the first identifier from the first network element;

determine, based on the first identifier, a second identifier identifying the target terminal device outside the 3GPP system; and send the second identifier to the application function network element, wherein the second identifier is used to expose an application programming interface corresponding to the second identifier.

9. The apparatus according to claim 8, wherein the one or more processors are configured to read the program in the memory to further cause the network capability exposure apparatus to:

send, to a unified data management network element, a third request comprising the first identifier; and receive the second identifier from the unified data management network element, wherein the second identifier is obtained by the unified data management network element based on the third request and a correspondence between the first identifier and the second identifier.

10. The apparatus according to claim 9, wherein the first identifier is a subscription permanent identifier of the target terminal device, and the second identifier is a generic public subscription identifier of the target terminal device.

11. The apparatus according to claim 9, wherein the first request further comprises an application identifier.

12. The apparatus according to claim 9, wherein the first identifier is an International Mobile Subscriber Identity (IMSI) of the target terminal device.

13. A non-transitory computer-readable storage medium, comprising computer instructions, wherein when the computer instructions are run on a network capability exposure apparatus, the network capability exposure apparatus is enabled to:

receive a first request from an application function network element, wherein the first request comprises an address of a target terminal device;

send a second request to a first network element, wherein the second request comprises the address of the target terminal device, and the second request requests a first identifier identifying the target terminal device in a 3rd Generation Partnership Project (3GPP) system;

receive the first identifier from the first network element;

determine, based on the first identifier, a second identifier identifying the target terminal device outside the 3GPP system; and send the second identifier to the application function network element, wherein the second identifier is used to expose an application programming interface corresponding to the second identifier.

14. The non-transitory computer-readable storage medium according to claim 13, wherein when the computer instructions are run on the network capability exposure apparatus, the network capability exposure apparatus is further enabled to:

send, to a unified data management network element, a third request comprising the first identifier; and receive the second identifier from the unified data management network element, wherein the second identifier is obtained by the unified data management network element based on the third request and a correspondence between the first identifier and the second identifier.

15. The non-transitory computer-readable storage medium according to claim 13, wherein the first identifier is a subscription permanent identifier of the target terminal device, and the second identifier is a generic public subscription identifier of the target terminal device.

16. The non-transitory computer-readable storage medium according to claim 13, wherein the first network element is a user plane function network element.

17. The non-transitory computer-readable storage medium according to claim 13, wherein the first network element is a policy control function network element.

18. The non-transitory computer-readable storage medium according to claim 17, wherein when the computer instructions are run on the network capability exposure apparatus, the network capability exposure apparatus is further enabled to:

before sending the second request to the first network element, send a fourth request to a binding support function network element, wherein the fourth request requests an address of the policy control function network element serving the target terminal device; and receive the address of the policy control function network element from the binding support function network element.

19. The computer-readable storage medium according to claim 13, wherein the first request further comprises an application identifier.

20. The computer-readable storage medium according to claim 13, wherein the first identifier is an International Mobile Subscriber Identity (IMSI) of the target terminal device.

* * * * *